(12) United States Patent
Hoffman et al.

(10) Patent No.: US 11,740,615 B2
(45) Date of Patent: Aug. 29, 2023

(54) AUTOMATED MANUFACTURING FACILITY AND METHODS

(71) Applicant: Swisslog Logistics, Inc., Newport News, VA (US)

(72) Inventors: Robert Anthony Hoffman, Marysville, MI (US); Steven J. Thorne, Yorktown, VA (US); Terry Joseph Krantz, Greenville, SC (US)

(73) Assignee: Swisslog Logistics, Inc., Newport News, VA (US)

( * ) Notice: Subject to any disclaimer, the term of this patent is extended or adjusted under 35 U.S.C. 154(b) by 938 days.

(21) Appl. No.: 16/500,447

(22) PCT Filed: Apr. 3, 2018

(86) PCT No.: PCT/US2018/025857
§ 371 (c)(1),
(2) Date: Oct. 3, 2019

(87) PCT Pub. No.: WO2018/187308
PCT Pub. Date: Oct. 11, 2018

(65) Prior Publication Data
US 2020/0192337 A1 Jun. 18, 2020

Related U.S. Application Data

(60) Provisional application No. 62/480,573, filed on Apr. 3, 2017.

(51) Int. Cl.
*G05B 19/418* (2006.01)
*G06Q 10/20* (2023.01)

(52) U.S. Cl.
CPC ... *G05B 19/4188* (2013.01); *G05B 19/41805* (2013.01); *G06Q 10/20* (2013.01);
(Continued)

(58) Field of Classification Search
None
See application file for complete search history.

(56) References Cited

U.S. PATENT DOCUMENTS 5,880,965 A 3/1999 Nakamura et al.
6,594,589 B1 7/2003 Coss, Jr. et al.
(Continued)

OTHER PUBLICATIONS

Georg Heinecke, "Resilient Automotive Production in Vulnerable Supply Networks a Supply Chain Event Management System", Doctoral Thesis, 2013, pp. 1-100, ETH Zurich, Zurich, Switzerland, Retrieved from the Internet: <URL: 2, 3,6,8, 9, 12, 15-20 https:l/www.research-collection.ethz.ch/mapping/eserv/eth:7891/eth-7891-02.pdf.>.

(Continued)

*Primary Examiner* — Sean Shechtman

(57) ABSTRACT

A manufacturing system (20) comprises: one or more stores (84; 80A-80C; 92) for raw materials, work-in-progress (WIP), and finished goods; a plurality of manufacturing cells (40A 40F), each cell includes: one or more machines (42A-42C) for manufacturing an assembly; and a programmable logic controller (PLC) (44) for controlling the machines; one or more devices (60, 70) for moving raw material, WIP, and finished goods; and one or more servers (32) for communicating with the PLCs and the devices. The one or more servers further have programming for: instructing (642) the plurality of manufacturing cells to assemble finished goods from the raw materials; instructing (628, 632) the one or more devices to move said raw materials and finished goods; and just in sequence (JIS) skipped assembly recovery steps (730) for the manufacturing cells and devices.

19 Claims, 10 Drawing Sheets

(52) U.S. Cl.
CPC .............. *G05B 2219/31001* (2013.01); *G05B 2219/31031* (2013.01); *G05B 2219/31323* (2013.01); *G05B 2219/34288* (2013.01)

(56) References Cited

U.S. PATENT DOCUMENTS

| | | |
|---|---|---|
| 2005/0021272 A1 | 1/2005 | Jenkins et al. |
| 2007/0063029 A1 | 3/2007 | Brandt et al. |
| 2007/0156543 A1 | 7/2007 | Klim et al. |
| 2007/0164862 A1 | 7/2007 | Dhanjal et al. |
| 2007/0282482 A1 | 12/2007 | Beucher et al. |
| 2014/0032169 A1 | 1/2014 | McCarthy et al. |
| 2016/0378093 A1 | 12/2016 | Freeman et al. |

OTHER PUBLICATIONS

David O'Sullivan, "Industrial Automation", Course Notes, May 2009, pp. 1-62, Universidade do Minho, Braga, Portugal, Retrieved from the Internet: <URL: https://pdfs.semanticscholar.org/9198/9bc 786ff72868772d 19d703acb450dc57bc7 .pdf>.

International Search Report and Written Opinion dated Jun. 22, 2018 for PCT/US2018/025857.

European Search Report and Opinion dated Mar. 18, 2021 for European Patent Application No. 18781054.4.

FIG. 10

AMSA DATABASE 800

| Table | Number |
|---|---|
| MANUFACTURING CELL TOOLING DATABASE TABLE | 820 |
| TASK DATABASE TABLE | 822 |
| ADVANCED SHIPMENT NOTIFICATION DATABASE TABLE | 824 |
| LOCATION DATABASE TABLE | 826 |
| MATERIAL FLOW MAPPING DATABASE TABLES | 828 |
| RECEIPT DATABASE TABLE | 830 |
| TOOLING DETAIL DATABASE TABLE | 832 |
| TRANSPORT ASSIGNMENT DATABASE TABLE | 834 |
| PRODUCT DATABASE TABLE | 836 |
| UNIT OF MEASURE DATABASE TABLE | 838 |
| PRODUCT ATTRIBUTE DATABASE TABLE | 840 |
| INVENTORY DATABASE TABLES | 842 |
| MAINTENANCE ACTIVITY TYPE DATABASE TABLE | 844 |
| MATERIAL STATUS DATABASE TABLE | 846 |
| ADJUST REASON DATABASE TABLE | 848 |
| MANUFACTURING CELL DATABASE TABLE | 850 |
| BILL OF MATERIAL DATABASE TABLE | 852 |
| ORDER TYPE DATABASE TABLE | 854 |
| MAINTENANCE SCHEDULE DATABASE TABLE | 856 |
| MANUFACTURING CELL TYPE DATABASE TABLE | 858 |
| MANUFACTURING CELL STATUS DATABASE TABLE | 860 |
| MANUFACTURING CELL OPERATION STATUS DATABASE TABLE | 862 |
| MANUFACTURING CELL INPUT POINT TYPE DATABASE TABLE | 864 |
| ORDER DATABASE TABLE | 866 |
| STORAGE ZONE DATABASE TABLE | 868 |
| STORAGE ZONE DATABASE TABLE | 870 |
| STORAGE CLUSTER DATABASE TABLE | 872 |
| LOCATION PROFILE DATABASE TABLE | 874 |
| CONTAINER TYPE DATABASE TABLE | 876 |
| ORDER LINE DATABASE TABLE | 878 |
| EXPECTED RECEIPT DATABASE TABLE | 880 |
| EQUIPMENT TYPE DATABASE TABLE | 882 |
| EQUIPMENT DATABASE TABLE | 884 |
| CONFIGURATION VALUES & BUSINESS RULES DATABASE TABLES | 886 |
| HOST INTERFACE MESSAGE LOG DATABASE TABLE | 888 |
| ORDER GROUP DATABASE TABLE | 890 |
| SHIPMENT DATABASE TABLE | 892 |
| AUDIT TRAIL DATABASE TABLES | 894 |
| AUDIT TRAIL ARCHIVE (DATA POOL) DATABASE TABLES | 896 |
| RECOVERY PLAN DATABASE TABLES | 898 |

AUTOMATED MANUFACTURING FACILITY AND METHODS

CROSS-REFERENCE TO RELATED APPLICATION

Benefit is claimed of U.S. Patent Application No. 62/480,573, filed Apr. 3, 2017, and entitled "Automated Manufacturing Facility and Methods", the disclosure of which is incorporated by reference herein in its entirety as if set forth at length.

BACKGROUND

The disclosure relates to manufacturing. More particularly, the disclosure relates to automation of manufacturing facilities.

An exemplary facility discussed below and shown in the drawings may represent an upgrade to a baseline facility having some or all of the same basic locations such as manufacturing cells and stores and the same basic layout of each manufacturing cell (e.g., the same number and type of cells and machines/stations in each cell). For example, the baseline facility may have fork trucks for material movements, having clip boards and check lists where the fork truck operators use memory to find materials in storage.

The baseline receiving area may have one or more receiving docks feeding a raw materials inbound staging area. The receiving docks may have PCs and connected local printers to print manifests containing truck load information received from the current operations server. Manual reconciliation of received inventory may be through the local PC.

The baseline inbound raw material staging area may have designated lane identification numbers for quick prestaging of loads for manual verification of receipt. Manual tacking of inbound inventory may be through check lists using fork truck operator memory to find materials in storage.

The baseline raw material storage area may have material racking to store the raw materials prior to delivery to the manufacturing cells. Manual tacking of inbound inventory may be through check lists using fork truck operator memory to find materials in storage.

The baseline plurality of manufacturing cells may have manual call buttons for replenishment assistance and check lists for identifying specific cell material requirements.

Baseline work in progress (WIP) storage areas may have material racking to store the WIP materials for temporary storage of in-process goods. Manual tacking of inbound inventory may be through check lists using fork truck operator memory to find materials in storage.

A baseline finished goods storage area may have material racking to store the finished goods prior to outbound finished goods staging in a finished goods staging area for subsequent shipment via one or more shipping docks. Manual tacking of finished goods inventory may be through check lists using fork truck operator memory to find materials in storage.

The baseline outbound finished goods staging area may have designated lane identification numbers for prestaging of out bound loads for manual verification of delivery may be through check lists using fork truck operator memory to find materials in storage.

The baseline shipping area may have one or more shipping docks, having PCs and connected local printers to print manifests containing truck load information received from the current operations server. Manual reconciliation of shipped inventory may be through the local PC.

A baseline tool storage and maintenance area may have storage locations for tool kits and spare parts and PC-connected local printers to print maintenance manuals containing worker instructions, spare parts lists, and required tool lists. Manual tacking of maintenance tasks, tool kits, spare parts and procedures may be through check lists.

An example of an aberrant situation in the baseline system, involves a shortage of a component used in some of the assemblies being assembled. For example, a manufacturing cell operator will realize that a component for a given assembly (e.g., assembly #3) is unavailable. The manufacturing cell operator will skip rack assembly #3 slot, leaving a space open in the rack. The manufacturing cell operator hand writes this information on a tag and affixes the tag to the rack. The operator proceeds with the remaining assemblies. Once the balance of assemblies are completed and loaded, a fork truck relocates the rack to a WIP storage location. The fork truck operator manually records the WIP storage location of the rack on a paper list. Once the out of stock parts for assembly #3 are replenished to the manufacturing cell, assembly #3 is manufactured. The manufacturing cell operator will communicate to a fork truck operator that assembly #3 is ready for relocation to the rack in storage. The fork truck will pick up assembly #3 and check the paper list for the location of the rack. The fork truck will then take assembly #3 to the location of the rack in WIP storage and place it in the reserved open slot. The rack is now filled completely with all the correct assemblies loaded in the correct sequence #1-#10. The fork truck will then take the completed rack to finished goods storage. The finished goods racks (containers) will then be scheduled by the fork truck driver for delivery to the OEM JIS (just in sequence).

SUMMARY

One aspect of the disclosure involves a manufacturing system comprising one or more stores for raw materials, work-in-progress (WIP), and finished goods; a plurality of manufacturing cells, each cell including: one or more machines for manufacturing an assembly; and a programmable logic controller (PLC) for controlling the machines; one or more devices for moving raw material, WIP, and finished goods; and one or more servers for communicating with the PLCs and the devices. The one or more servers further have programming for: instructing the plurality of manufacturing cells to assemble finished goods from the raw materials; instructing the one or more devices to move said raw materials and finished goods; and just in sequence (JIS) skipped assembly recovery steps for the manufacturing cells and devices.

In one or more embodiments of any of the foregoing embodiments, the just in sequence (JIS) skipped assembly recovery steps comprise: instructing a manufacturing cell to skip manufacture of an assembly in a sequence of assemblies while manufacturing remaining assemblies in the sequence; instructing the loading of a shipping container with the remaining assemblies while leaving vacant a designated space in the container; and instructing one of the devices to take the shipping container with vacant space to a WIP store.

In one or more embodiments of any of the foregoing embodiments, the manufacturing system further comprises: a tool maintenance and spare parts area containing tools, spare parts for tools, equipment for repairing and maintaining the tools, and means for communicating with the one or more servers.

Another aspect of the disclosure involves a manufacturing system comprising one or more stores for raw materials work-in-progress (WIP), and finished goods; a plurality of manufacturing cells, each cell including: one or more machines for manufacturing an assembly; and a programmable logic controller (PLC) for controlling the machines; one or more devices for moving raw material, WIP, and finished goods; and one or more servers for communicating with the PLCs and the devices. The one or more servers further have programming for: automatic cell health assessments of the manufacturing cells; and automatic maintenance scheduling for the manufacturing cells.

In one or more embodiments of any of the foregoing embodiments, the one or more servers further have programming for: communicating predetermined assembly sequencing to the PLC; communicating target assembly parameters to the PLC; communicating unique assembly identification numbers to the PLC; recording achieved assembly parameters in a data base; and recording cell level error codes from the PLC to a data base.

In one or more embodiments of any of the foregoing embodiments, the one or more servers further have programming for: automatic change over planning for conversion of the manufacturing cells; automatic communication and tracking of just in sequence (JIS) skipped assembly recovery steps; automatic cell inventory tracking from the PLC to a data base; and automatic real time inventory verification to the PLC.

Another aspect of the disclosure involves a method for operating a manufacturing system. The manufacturing system comprises: one or more stores for raw materials, work-in-progress (WIP), and finished goods; a plurality of manufacturing cells, each cell including: one or more machines for manufacturing an assembly; a programmable logic controller (PLC) for controlling the machines; one or more devices for moving raw material, WIP, and finished goods; and one or more servers for communicating with the PLCs and the one or more devices. The method comprises: using the plurality of manufacturing cells to assemble finished goods from the raw materials; using one or more devices to move said raw materials and finished goods; and communication and tracking by the server of just in sequence (JIS) skipped assembly recovery steps for the manufacturing cells.

In one or more embodiments of any of the foregoing embodiments, the communication and tracking of just in sequence (JIS) skipped assembly recovery steps comprises: instructing a manufacturing cell to skip manufacture of an assembly in a sequence of assemblies while manufacturing remaining assemblies in the sequence; instructing the loading of a shipping container with the remaining assemblies while leaving vacant a designated space in the container; instructing one of the devices to take the shipping container with vacant space to a WIP store.

In one or more embodiments of any of the foregoing embodiments, the communication and tracking of just in sequence (JIS) skipped assembly recovery steps further comprises: instructing a manufacturing cell, optionally the same cell that made the remaining assemblies, to make the skipped assembly; and loading the skipped assembly into the vacant space.

In one or more embodiments of any of the foregoing embodiments, the method further comprises: automatic cell inventory tracking from the PLC to a data base; and automatic real time inventory verification to the PLC.

In one or more embodiments of any of the foregoing embodiments, the method further comprises: automatic cell health assessments of the manufacturing cells; automatic maintenance scheduling for the manufacturing cells.

In one or more embodiments of any of the foregoing embodiments, the method further comprises: automatic change over planning for conversion of the manufacturing cells.

In one or more embodiments of any of the foregoing embodiments, the one or more devices comprise driver-operated fork trucks with operator interface tablets communicating with the server.

In one or more embodiments of any of the foregoing embodiments, the method further comprises one or more of: the server communicating predetermined assembly sequencing to the PLC; the server communicating target assembly parameters to the PLC; the server communicating unique assembly identification numbers to the PLC; the server recording achieved assembly parameters in a data base; and the server recording cell level error codes from the PLC to a data base.

A further embodiment is shown in claim 15 with yet further embodiments shown in the subclaims.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 10 is a diagram of an adaptive manufacturing software application (AMSA) database.

Like reference numbers and designations in the various drawings indicate like elements.

DETAILED DESCRIPTION

Figure 1:
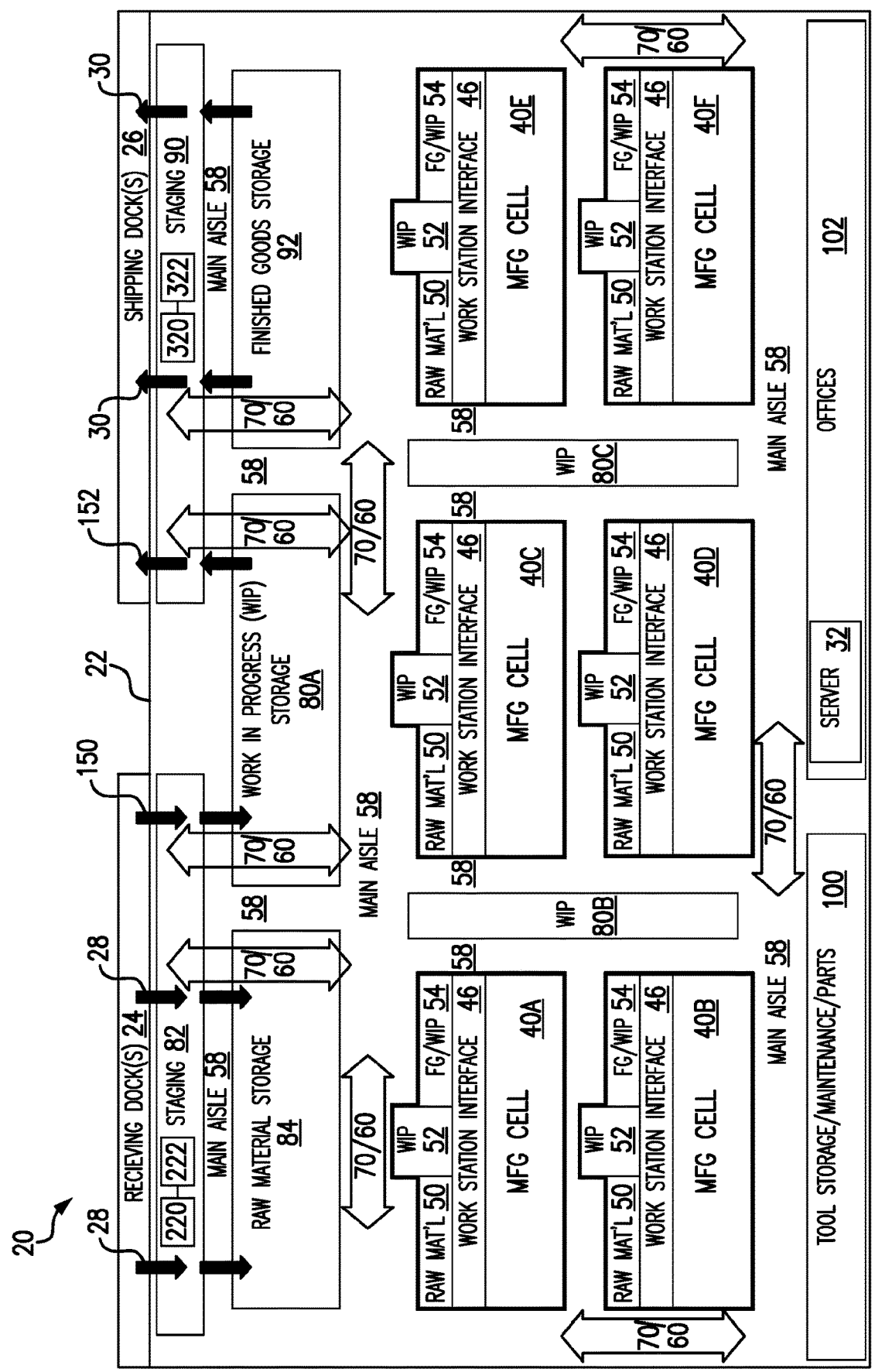
FIG. 1 is a schematic view of a manufacturing facility.

FIG. 1 schematically shows a manufacturing facility 20. The exemplary facility is shown as a single building 22. However, multi-building facilities may be involved. As is discussed further below, the building contains various locations or areas containing various equipment and in which various hardware steps are performed.

For purposes of illustration, there is a flow of materials from one or more loading locations (shown as a single loading/receiving dock 24) through the facility to one or more shipping locations (shown as a single shipping dock 26). Alternative implementations may further subdivide these locations or combine them. The raw material inflows 28 may include many different levels from bulk chemicals or solid materials (plastics, metals, etc.) up to subassemblies to be further integrated into the ultimate finished goods for outflows 30.

Additional locations for inflows and outflows (such as utilities, waste, and the like) are not shown but may be as conventional in the field of the relevant facility. Thus, a discussed example mentions the automotive industry in the context of a Tier One supplier making steering assemblies for an auto manufacturer.

A large number of the systems, products, materials, and the like in or flowing through the facility may be monitored and/or controlled by an automated system designated in some instances herein as an adaptive manufacturing software application (AMSA). This may comprise software running on one or more servers which may include one or more servers 32 in the facility, one or more servers at associated remote facilities, and/or one or more virtual or cloud-based servers not located in any related facility. Each server may have one or more processors, memory, storage for storing the data and storing/running the programs discussed.

Such control and communication by/with the server(s) may be direct or indirect via analog or digital hardwiring (e.g., Ethernet) or wireless 34 (FIG. 2) (e.g., WiFi or Bluetooth) or combinations.

With the foregoing example of automotive steering wheels as goods, the server database has a vehicle-specific reference (e.g., purchaser/owner name) for each steering wheel final assembly and is thus integrated with the auto manufacturer's database so that a specific steering wheel can ultimately be installed in a specific car ordered by a buyer.

Figure 2:
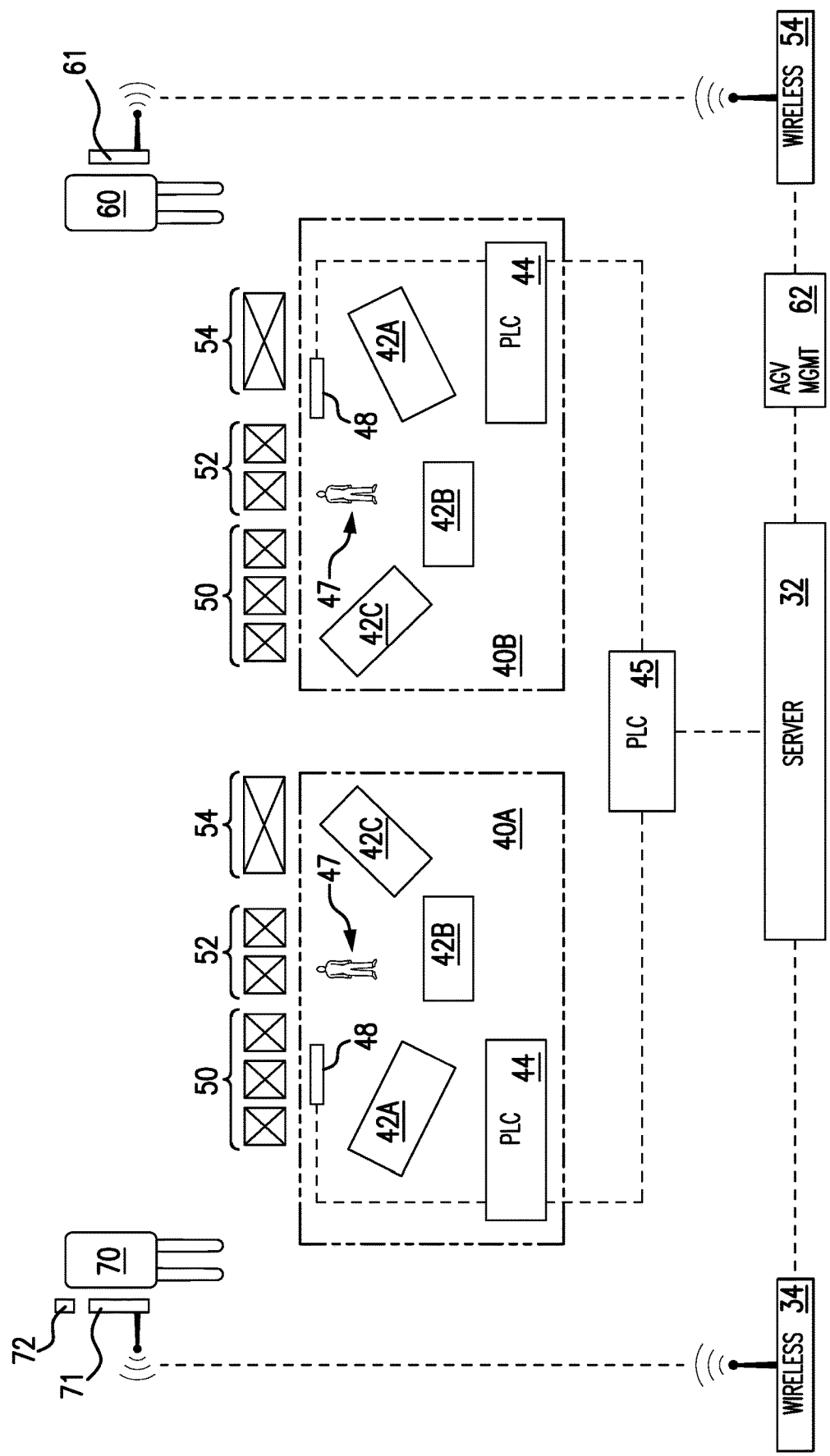
FIG. 2 is a schematic view of a pair of manufacturing cells in the manufacturing facility of FIG. 1.

The facility includes multiple manufacturing cells 40A-40F wherein manufacturing steps are performed by associated machines/stations 42A-C (FIG. 2). Depending on the nature of the facility, these may include molding, stamping, machining, and/or assembly steps and may have varied degrees of automation.

In the illustrated example, the cells operate in parallel, each normally performing the end-to-end manufacture steps on a given finished product. In such a configuration, within each cell, there may be multiple tools or stations performing the separate tasks involved. In the illustrated example, there is only a single station per step and the steps are sequential (e.g., flow is from station 1 (42A) to station 2 (42B) to station 3 (42C) in a three-station cell). More complex cells are possible.

An exemplary manufacturing cell comprises one or more machines which may include robots performing assembly operations and handling operations. Where manual operations are involved, there may be support equipment for the manual operations (e.g., hand tools, assist fixtures, and the like). Each machine or location of machine or manual assembly may be deemed a "station". There may be one or more manufacturing cell PLCs 44 (programmable logic controllers) for these components running software particular to the operation of such components. In the illustrated multi-station cell example, a single workstation interface PLC 45 may integrate with all or multiple stations in the cell. The workstation interface PLC 45 is in communication with the server(s) 32 as discussed above). HMI (human machine interfaces) 48 (FIG. 1) such as tablets or other control consoles (e.g., with touch screen displays for providing information to the operator and receiving input from the operator 47 (FIG. 2)) may be in communication with the manufacturing cell PLC 44 or integrated with a console of the manufacturing cell PLC 44. Manufacturing cell PLC 44 communicates with workstation interface PLC 45. Workstation interface PLC 45 has the capability to convert PLC communications into messages sent to AMSA Server.

The system also includes various stores 50, 52, 54 for incoming raw materials, work-in-progress (WIP) and finished goods.

The system also includes various transportation systems for transporting such raw materials, work-in-progress (WIP) and finished goods along a flow path from the loading locations through one or more manufacturing cells to the shipping locations with one or more stops in the relevant store(s). These may move along main aisles 58 between different areas in the facility.

One example of a transportation system/device is an AGV 60. This may comprise a battery-powered wheeled vehicle with integrated controller 61 running vehicle control software and communicating wirelessly with an AGV management system 62. The AGV management system may be a dedicated system (separate from but communicating with the main server(s)) operating a dedicated wireless network 64 for the AGVs. It thus includes appropriate processor, memory, and storage for running AGV management software.

Another example of a transportation system/device is a fork truck (fork lift truck (FLT)) 70. This may comprise a driver-operated fork truck, having device(s) 71 for communicating with the server and providing the server 32 with information about materials being transported. Such devices 71 may include a wireless tablet (e.g., with processor, memory, storage and touchscreen) or similar device for use by the driver/operator and a portable bar code scanner 72 or similar device (e.g., wirelessly coupled or hardwired to the tablet) for interrogating materials, locations, and the like.

Discussed further below, the further areas in the facility may include WIP storage areas 80A-80C not specific to manufacturing cells. An inbound raw materials staging area 82 is between the receiving dock 24 and a raw material storage area 84. An outbound finished goods staging area 90 is between the shipping dock 26 and a finished goods storage area 92. A tool storage and maintenance and spare parts area is shown as 100. As discussed below, the raw material storage area 84 and the finished goods storage area 92 may each comprise an automated storage and retrieval system (ASRS). The ASRS may each handle/store one or more dedicated container types. The area 84 ASRS or other location in area 84 may hold empty such raw materials containers for return to supply trucks/trailers after the trucks/trailers are emptied. The area 92 ASRS or other location in area 92 may hold empty such finished goods containers returned by shipping trucks/trailers before those trucks/trailers are loaded with finished goods.

In the illustrated example, WIP storage area 80A is a main WIP storage area and WIP storage areas 80B and 80C are secondary WIP storage areas. One division is that the main WIP storage area can serve for long term storage; while the secondary WIP storage areas can server as shorter term buffering storage.

As a further optional variation, the exemplary main WIP storage area 80A is shown having access to the receiving dock(s) 24 and the shipping dock(s) 26. This access may be useful in several situations. In one example of parallel manufacturing cells that each perform a full assembly operation, subassemblies (subassembly inflow 150 in FIG. 1) may be received and stored in the main WIP storage area 80A. Such subassemblies might skip one or more of the steps/ workstations in the cell(s). For example, in the example of vehicle steering assemblies, the subassemblies might be made by an outside vendor for a special edition of a vehicle and already reflect the level of assembly performed by the first tool/station 42A. Thus, they can proceed straight to tool/station 42B

Likewise, subassemblies might be shipped out (subassembly outflow 152 in FIG. 1) before completing the normal steps in a cell (e.g., to be sold on the spare parts market or to other OEMs).

Other examples involve manufacturing cells operating in series. For example, one or more first cells operating in parallel may perform the first level of assembly via one or more tools/stations. Thereafter, one or more second cells operating in parallel may perform the next level of assembly. Or one more first cells in parallel may make a first type of subassembly, one or more second cells in parallel may make a second type of subassembly, and one or more third cells in parallel may assemble the two types of subassembly to make an assembly. Numerous more variations are possible. In series operation, the location 54 in the first cell is for the finished product of that cell which is still WIP in terms of the overall process of the facility. When that product ultimately goes to the second cell, it may be stored as raw material in the second cell's area 50 along with any raw material that is actually raw as in straight from the raw material storage 84. In both series and non-series situations, area 52 of a given cell may represent work that is at an intermediate stage of the process performed by that cell.

There may be one or more normal designed flowpaths (known as the "happy" paths) through the facility. For example, in examples where multiple cells operate in series, the raw materials may go through several groups of cells to make several different subassemblies which are further assembled to each other in additional cells, etc. There may be buffering in the stores. Where cells operate alone (e.g., do the entire end-to-end assembly) there also may be such designed flow paths from machine/workstation to machine/workstation (40A to 40C in the illustration).

Additionally, there may be aberrant situations wherein a shortage or other problem causes a fully or partially completed (sub)assembly to need to be stored at a point in the normal flowpath where it would not be stored (to await further work or further assembly) but would be passed to a further manufacturing cell (or further machine/workstation in a cell) or shipped or stored for shipping.

A specific example is a facility operating in a just-in-sequence (JIS) model. In this situation normally assemblies are manufactured to a "build list" that matches the OEM build schedule for the day. The build list has the customer specific assemblies matching the customers' options ordered at the dealership. The container (e.g., a rack as discussed below) for the example assemblies holds 10 assemblies (e.g., in sublocations in the container such as slots). These assemblies are being built in sequence of #1-#10 for a specific rack. The parts for those assemblies are all available and a given manufacturing cell (in the illustrated example) builds all the assemblies for that batch in sequence. The rack is filled completely with all the correct assemblies loaded in the correct sequence #1-#10. The completed rack is then moved to finished goods storage. The finished goods racks will then be scheduled for delivery to the OEM JIS (just in sequence).

However, as noted in the background section above, an example of an aberrant situation is where one or more parts are out of stock temporarily for a given assembly (e.g., assembly #3 in that #1-#10 sequence). In that example, the manufacturing cell will "skip" assembly #3 and move on to manufacture assembly #4.

The facility may represent an upgrade to a baseline facility as noted in the background section above. The baseline facility has some or all of the same basic locations such as manufacturing cells and stores and the same basic layout (e.g., number and type of cells and machines/stations) of each manufacturing cell.

The present system may replace or modify the fork trucks such as by adding a portable bar code scanner 72 connected to a wireless tablet 71 that communicates to the server 32 through the wireless network 34. As noted above, AGVs 60 may be added or existing AGVs further integrated with overall system functions. Although separate fork trucks are identified as associated with specific functions, the system is not necessarily limited. A given fork truck (or AGV) might be used for several different types of tasks. There may be different forms of fork truck or AGV (e.g., sizes which may limit the tasks for which they are used). The AMSA system may assign tasks to individual fork trucks based on capacity, availability, or other considerations. Additionally, depending on facility layout, there may be conveyor or other systems intervening. Although the fork trucks are identified as having tablets for operator interface and communication with the AMSA, other interfaces may be used. Similarly, although barcode readers are coupled to the tablets, workstations, and the like for inventory control and other purposes, other systems (e.g., RFID) may be used.

Periodically, the AMSA system receives information from outside (either directly or indirectly via the co-hosted ERP). For example, at the beginning of each work day (or at a predesignated time in advance), the OEM's system sends a build list for the day. The build list comprises a list of the specific assemblies (identification and specifications (e.g., features)). For example, the OEM expects to receive the assemblies for the day in a given order. Assume 1000 assemblies to be delivered, ten assemblies per rack, ten racks per truck (or trailer), for ten truck loads. The AMSA system will then act to cause those assemblies to be loaded in an appropriate order (e.g., although the first truck will have the first ten racks of 100 assemblies, they will be staged so that the racks are loaded in reverse order so that the first rack will be the first unloaded at the OEM).

The receiving and inbound raw material staging area may have portable scanners 222 (FIG. 1) connected wirelessly to PCs 220 (or tablet or other device) for communicating reconciled manifests to the AMSA. A supervisor in the area uses the scanner to scan a barcode on the manifest. The PC sends the barcode information to the AMSA.

Baseline inbound raw material staging area fork trucks may be replaced or modified as above. The AMSA sends instructions to a fork truck tablet 71 instructing the operator to unload a given truck 70 (e.g., via identification of a particular dock space and associated unloading lane). The fork truck operator begins to unload by picking up and scanning the first inbound container. The driver then takes the container to the associated lane. The driver scans the lane identification and container identification numbers with portable bar code scanner. The fork truck tablet communicates these locations to the AMSA. The AMSA then records these locations in the matrix for automatic verification of receipt. This eliminates manual tracking of inbound inventory through check lists and relying on fork truck operator memory to find materials in staging. The AMSA also communicates the reconciliation to ERP. Both the AMSA and ERP reside on the same server. This may eliminate manual reconciliation of received inventory through the local PC. ERP then approves the load for billing, etc.

Baseline raw material storage area fork trucks may be replaced or modified as above. The AMSA then communicates to a fork truck tablet 71 instructions for the operator to then retrieve the unloaded goods from a given lane. The fork truck driver goes to the lane identified by the AMSA. The fork truck operator picks up and scans the first inbound container he comes to in that lane. The tablet communicates the identification of the container to the AMSA which verifies that it is a container from the correct lane. The AMSA then communicates to the fork truck tablet instructions for the operator to then take the goods to a given location in raw material storage 84. Upon reaching the location, the fork truck operator places the goods in the designated location and scans designated storage location identification and container identification numbers with the portable bar code scanner. The fork truck tablet communicates the location to the AMSA on the server. The AMSA then records the location in the matrix to associate the goods with such location. The AMSA system may thus provide virtual inventory management for quick storage and retrieval of containers, eliminating manual tacking of inventory through check lists and relying on fork truck operator memory to find materials in storage.

The manufacturing cells 40A-40F are connected to the AMSA running on the server 32. The AMSA calculates manufacturing cell inventory levels in real time. The AMSA records the real time levels then compares them to replenishment trigger values. Once the trigger values are reached, the AMSA records a replenishment task to the matrix. The AMSA then communicates the list of scheduled replenishment tasks to the fork truck tablet. This removes manual call buttons for replenishment assistance and check lists for identifying specific cell material requirements. The AMSA communicates to the fork truck tablet the relevant location in raw materials storage 84 and an identification of the particular materials therein. The fork truck operator goes to the identified location in raw materials storage picks up and scans the container. The tablet 71 communicates this identification to the AMSA which verifies and, in turn, communicates to the tablet the identification of the particular manufacturing cell and a raw goods replenishment location 50 at the cell to which the operator takes the goods. At the manufacturing cell, the operator unloads and scans the location and goods. The tablet communicates this to the AMSA which verifies and updates its matrix.

The baseline WIP storage area fork trucks may be replaced or modified as above. As is discussed further below, when a rack needs to be taken from a manufacturing cell to WIP storage, the AMSA communicates the manufacturing cell identification and emerging finished goods/WIP location 54 at the cell to the fork truck tablet. The fork truck operator goes to the designated cell/container location. The fork truck operator scans the designated storage location identification and container identification numbers with the portable bar code scanner. The fork truck tablet communicates these to the AMSA. The AMSA then verifies and records in the matrix that the fork truck has acquired the goods (e.g., the fork truck is treated as a mobile location in the matrix). This creates virtual inventory management for quick storage and retrieval of containers, eliminating manual tacking of WIP inventory through check lists and relying on fork truck operator memory to find materials in storage. Removal/recall from WIP storage is discussed below.

Baseline finished goods storage area fork trucks may be replaced or modified as above. Dedicated outbound shipping containers (racks) located at the finished goods output location 54 at the manufacturing cell are loaded. The AMSA communicates the manufacturing cell identification and rack location identification at the cell to the fork truck tablet 71. The fork truck operator goes to designated cell/rack location. The fork truck operator scans the designated storage location identification and rack identification numbers with the portable bar code scanner. The fork truck tablet communicates these locations to the AMSA. The AMSA then verifies and records in the matrix that the fork truck has acquired the goods. This creates virtual inventory management for quick storage and retrieval of racks, eliminating manual tacking of finished goods inventory through check lists and relying on fork truck operator memory to find materials in storage.

Baseline outbound finished goods staging area fork trucks may be replaced or modified as above. The AMSA communicates rack location and rack identification numbers to the fork truck tablet. The fork truck operator goes to designated location in the finished goods storage area 92. The fork truck operator gets the designated rack from the designated storage location and scans the location and rack identification numbers with the portable bar code scanner 71. The AMSA communicates to the fork truck driver the designated staging area lane (lane from which a particular truck will load) identification and rack location (in that lane) identification numbers. For example, the lane may have an outline of the truck or trailer cargo box footprint with individual rack locations marked. The fork truck drives to the designated lane. The fork truck operator scans designated lane identification and rack location identification numbers (e.g., bar code painted on the floor) with portable bar code scanner. The fork truck tablet communicates these locations to the AMSA. The AMSA then verifies and records these locations in the matrix as having received the particular rack from the fork truck. The AMSA communicates this information to ERP for automatic verification of shipping manifest. This eliminates manual tacking of outbound inventory through check lists and relying fork truck operator memory to find materials in staging.

The shipping area (shipping dock(s) 26 and associated staging area 90) may have portable scanners 322 connected wirelessly to PCs 320 for printing manifests on one or more printers. A paper manifest is still required for the truck despite the elimination of paper for internal operations of the facility. The PCs/printers automatically print manifests from the AMSA and the ERP, eliminating manual reconciliation of shipped inventory through the local PC. Upon the final rack for a given load being verified in the lane, the AMSA verifies and caused the PC to print the manifest. The AMSA summons (communicates to the tablet 71) a fork truck for loading the outbound truck (inclusive of truck/trailer). ERP may have already summoned the relevant truck to the loading dock and it may be there or in queue. The fork truck driver scans the relevant lane identification and the tablet communicates this to the AMSA to verify. The AMSA communicates the rack identifications and load sequence to the tablet. The fork truck operator goes to the location of the first-to-load rack and scans that rack. The tablet verifies the correct rack. The operator loads to the truck and uses the tablet to send confirmation to the AMSA. The operator repeats with the remaining racks. Upon loading the last rack, the AMSA sends confirmation to ERP.

Figure 3:
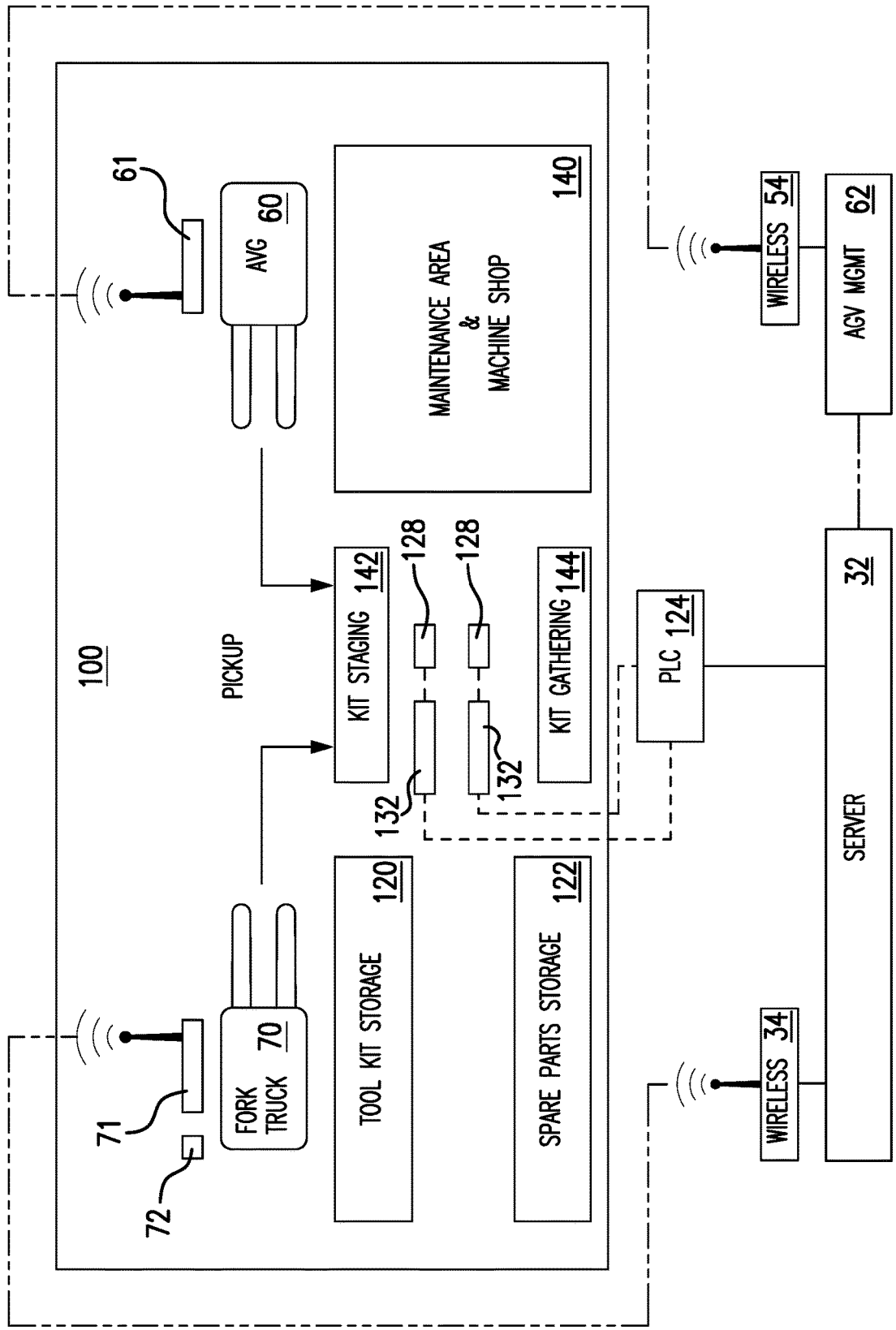
FIG. 3 is a schematic view of a tool maintenance and storage and tool spare parts storage area in the manufacturing facility of FIG. 1.

The tool storage/maintenance/spare parts area 100 may receive individual bar code number affixed to tool kits and spare parts for the stations/machines and has storage locations 120 and 122 for such tool kits and parts. It also has a workstation interface PLC 124 communicating with the AMSA. A portable bar code scanner 128 and wireless tablet 130 are connected to the workstation interface PLC 124 for communicating with the AMSA. Operators scan storage locations, tool kits and spare part ID codes with the portable scanner during put away and retrieval operations. The workstation interface PLC 124 communicates tool kit and spare parts inventory to the AMSA. The wireless tablet may download maintenance manuals containing worker instructions, spare parts lists and required tool lists. The AMSA automatically notifies the tablet of scheduled maintenance tasks. The AMSA provides, via the tablet, automatic guidance to retrieve tool kits and spare parts from storage inventory. This may eliminate manual tacking of scheduled tasks, tool kits, spare parts and procedures through check lists. FIG. 3 further shows a dedicated maintenance area/machine shop 140, kit staging area 142, and kit gathering area 144.

In an example of the aberrant situation above, the AMSA knows that a part is unavailable for assembly #3 in a given rack of assembles to be made. The AMSA notifies (via the manufacturing cell PLCs 44 and workstation interface PLCs 45), the relevant manufacturing cell to skip assembly #3. The AMSA records in its matrix that the subject rack will be incomplete in lacking assembly #3. The AMSA proceeds to complete the building of the remaining assemblies in that rack. Once the balance of assemblies are completed and loaded, the AMSA will communicate to the fork truck the location of the rack (discussed above in the context of WIP storage). The fork truck operator retrieves and scans the rack. The AMSA instructs (via the tablet) the operator to deliver the rack to a given location in WIP storage. The fork truck will relocate the rack to the WIP storage location. The fork truck operator will scan the rack identification number and storage location number. The AMSA will verify and record this storage information in the matrix.

Once the out of stock parts for assembly #3 are replenished to the manufacturing cell, the AMSA will insert assembly #3 into the build sequence. This may occur during the build sequence for a subsequent rack. The cell manufactures assembly #3. The manufacturing cell then communicates to the AMSA that assembly #3 is ready for relocation to the rack in storage. The AMSA summons a fork truck as discussed above. The fork truck will pick up assembly #3 and its operator will scan the assembly identification number with the portable bar code scanner. This is communicated by the tablet to the AMSA for verification. The AMSA will communicate the WIP store location of the associated partial rack to the fork truck tablet. The fork truck will then take assembly #3 to the location of the rack in WIP storage and place it in rack slot #3. Depending on the nature of goods, there may be no pallet for the fork truck to use, so the driver may merely carry the assembly while driving. The operator scans the location (slot) in the rack and sends (via the tablet) this information to the AMSA to verify and store in its matrix. The rack is now filled completely with all the correct assemblies loaded in the correct sequence #1-#10.

If the nature of the assemblies permit, the same fork truck may then move the rack to finished goods storage. Otherwise, the AMSA may summon an appropriate truck. The AMSA instructs the tablet with a location in finished goods storage as in the case of goods being sent directly from the manufacturing cells. The finished goods racks will then be scheduled for delivery to the OEM JIS (just in sequence).

A further discussion of an exemplary system is given below. The AMSA software is installed on the facility's IT infrastructure on a central server 32. The facility's main operations software responsible for manufacturing execution will reside on this same server. The AMSA may communicate the other locations and devices (AMSA clients such as the various tablets, etc.) by both hardwired and wireless networks. These AMSA clients may access the AMSA via a web browser, app, or the like.

The AMSA may maintain an item master record in the database that stores the input and output parts required for WIP and final assembly (sent by the ERP system). The AMSA software task manager module (discussed below) will create and prioritize tasks based on one or more of: type of equipment used to transfer; speed of equipment; manufacturing cell replenishment demand; equipment capacity; operator variability. The AMSA software will support this by persisting various database entities stored on the server 32. Exemplary database fields for the item master are: product identifier, product description, bill of materials if part is a sub-assembly and tooling required. Exemplary database fields used to prioritize tasks are: equipment type, defining type of container the equipment can handle, the number of containers the equipment can carry at any one time, speed of equipment; manufacturing cell raw material and WIP location inventory levels.

The AMSA will receive data from each piece of equipment within the operation and transfer this operational data (e.g., sub-assembly completion timestamp, part manufactured successfully, successfully with intervention or unsuccessfully, how long the sub-assembly took to manufacture the sub-assembly, power consumed to manufacture sub-assembly) to a data pool (a database server (not shown) separate, from the AMSA software server) for subsequent data analysis. The extracted data can be customized for each piece of equipment. The AMSA may transfer all this data between different operations within the facility.

The AMSA can also present the end resulting data calculations to different operations within the site. This can be through the various manufacturing cell interface tablets 48 within the site or via other visual management devices that can access the AMSA server and run a web browser to run an AMSA client session as needed. An example would be an associate's smart phone or tablet. This could be done either locally or by remote access through the internet. Gathering of this data from the different devices via manufacturing cell PLC 44 and the AMSA software. This data can be used for but not limited to: predictive maintenance; required maintenance materials; automation health assessment; tool change out for model specificity; error tracking; productivity; operation status (e.g., sub-assembly completion timestamp, part manufactured successfully, successfully with intervention or unsuccessfully, how long the sub-assembly took to manufacture the sub-assembly, power consumed to manufacture sub-assembly, number of cycles since last manufacturing cell maintenance activity, average uptime between interventions, current uptime since last intervention).

The work station interface 46 comprises a population of tablets 48 and manufacturing cell PLCs 44. The manufacturing cell PLC 44 can communicate to multiple tablets 48. These tablets can be in one or multiple manufacturing cells. The manufacturing cell PLC 44 will communicate to the manufacturing cell devices as well as to the workstation interface PLC 45. The workstation interface PLC 45 communicates with AMSA. All tasks within this interface may be executed by the AMSA software. The interface tablets may be fixed or mobile. The manufacturing cell tablets 48 comprise a touch screen. Optionally the tablets could be a mobile device attached to the user themselves as in a wrist mounted or pocket device. The work station interface will be use to track the current status of all raw material, parts that are currently being assembled together in the manufacturing cell, WIP and finished goods (FG) at the manufacturing cell. This interface will be automatic, semi-automatic or manual depending on the operation requirements. When the raw material, semi-finished goods or WIP are delivered to the manufacturing cell both the location and material ID will be scanned and recorded. This information will be communicated stored in the AMSA software by the work station interface PLC 45 through the wireless network. The material ID will be used to retrieve the part quantity per container for the material in the specific locations and use this to calculate a replenishment task. As the manufacturing cell consumes raw material, the AMSA software will track the consumption through communication between the work station interface PLC 45 and the manufacturing cell PLC 44. The AMSA software will have material specific replenishment trigger quantities. As the raw material quantity is diminished, the inventory of the container will reach a predetermined trigger quantity. When these trigger quantities are met, the AMSA software will create a replenishment task. The replenishment task will tell the operation where to get the material in the raw material storage area 84 and what location in the manufacturing cell raw material area 50 to deliver it. The nearest next available AGV or fork truck will retrieve the material and execute the task.

The AMSA software will use this pre-set trigger quantity as a manual confirmation of current cell inventory. When this trigger quantity is met it will require the operator to manually count and confirm the quantity matches. This is communicated from the AMSA to the manufacturing cell PLC 44 and tablet. If the actual quantity does match, the operator will indicate "Yes" on the work station interface tablet 48. If the quantity does not match the operator will indicate this by pressing "No" on the work station interface tablet. After this step, the AMSA software will require the operator to enter the correct current quantity and press "Enter" on the Work station interface tablet. This information will be fed back to the AMSA by the work station interface PLC 45.

This operation removes out of stock conditions created by incorrect part quantities in the replenished container. Preventing further out of stock and production stoppages. This allows 100% inventory control of raw material, semi-finished goods and WIP with in the manufacturing system.

To process finished goods, an empty finished goods container ID will be scanned and the container placed in a specific location at the manufacturing cell finished goods area 54. This location ID will be scanned as well. Both the location and container ID will be recorded in the AMSA software. As the manufacturing cell creates the finished goods produced by the cell, it will communicate the completion of the part via the manufacturing cell PLC 44 and the work station interface PLC 45. The accumulated quantity of these parts will be recorded on the manufacturing cell PLC 44 and communicated to the AMSA. The finished goods will be loaded into the finished goods container. As the finished goods quantity is increased, the AMSA software will have material specific replenishment trigger quantities for the replacement of the full container with an empty container.

When these trigger quantities are met, the AMSA software will create an empty container replenishment task. The replenishment task will detail the location of the container selected for replenishment within the WIP storage area 80A, 80B and/or 80C (for cells performing an intermediate stage of a series process) or within the finished goods storage area 92 (for the final stage or only stage cell in example where dedicated finished goods containers return to finished goods storage) and what location in the manufacturing cell FG/WIP area 54 to deliver it. The AMSA software will use a pre-set trigger quantity as a manual confirmation of current cell inventory. When this trigger quantity is met it will require the operator to manually count and confirm the quantity matches. This is communicated from the AMSA to the manufacturing cell PLC 44 and tablet 48. If the actual quantity does match, the operator will indicate "Yes" on the tablet 48. If the quantity does not match the operator will indicate this by pressing "No" on the tablet 48. After this step, the AMSA software will require the operator to enter the correct current quantity and press "Enter" on the tablet 48. This information will be fed back to the AMSA by the manufacturing cell interface PLC 44. This operation removes full container conditions created by incorrect part quantities in the finished goods container. Preventing further production stoppages due to blockage downstream. This allows 100% inventory control of finished goods with in the manufacturing system.

An example of operation in out of stock scenarios for JIT/JIS (just in time/just in sequence) operations is given below in the context of steering wheels for automobile manufacturer as noted in the background above. For reference, the specific steering wheels are identified with the first names of customers who have placed orders. However, the database may use a more generic identification number such as a VIN. For this operation description we will use the assembly of steering columns in the steps. The finished goods container holds ten (10) assemblies. These assemblies are manufactured to match the customers build sequence for color and options. assembly for rack position #1 is Bill's black leather wrapped steering wheel; assembly for rack position #2 is Jim's brown leather wrapped steering wheel; assembly for rack position #3 is Mary's grey leather wrapped steering wheel; assembly for rack position #4 is Kate's black leather wrapped steering wheel; assembly for rack position #5 is Jack's black leather wrapped steering wheel; and so on until the rack is full. These racks are delivered to the customer in a JIT/JIS process.

During the assembly of steering columns, the operation is attempting to assemble Mary's grey leather wrapped steering wheel. The AMSA software realized we have a severe out of stock scenario and that we would not have the grey leather wrapped steering wheel Mary requires. The AMSA software will allow the operation to skip over assembly of Mary's steering wheel and go on to Kate's black leather steering wheel. If the part required does not arrive to the manufacturing cell in time before the rest of the finished goods ten parts are completed, the AMSA will tag the finished goods container as incomplete and track its location within the WIP Storage. This will be communicated to the AMSA through the work station interface PLC 45 and tablet 48. This communication will be through the wireless network.

Once the parts arrive to the cell for completion of Mary's Steering Wheel, the manufacturing cell interface PLC 44 will pull the assembly instructions forward and inform the operator to build Mary's Steering Wheel. This will be communicated through the manufacturing cell PLC 44 and tablet.

Once the steering wheel is completed, the manufacturing cell PLC 44 and tablet 48 will inform the AMSA that Mary's grey steering wheel is completed. AMSA will notify the manufacturing cell operator 47 via the tablet 48 that this is a special situation and to set the assembly aside for manual pick up.

Once Mary's steering wheel is picked up and its ID scanned, the fork truck RF terminal 70 (tablet) will tell the operator to take the steering wheel to a specific location ID within WIP storage for completion of the JIT/JIS container.

Upon arrival at the container, the fork truck operator will scan the finished goods container ID, the container location ID (position #3) and Mary's steering wheel part ID then place the part in position #3. The AMSA software will register this information and tag the finished goods container as complete and ready for shipment. This can be done for one or multiple parts for one or multiple containers. The advantage of this process is that the Manufacturing cell can continue to operate and produce parts it has material for. Then once the out of stock material arrives at the manufacturing cell the operator can follow instructions from the AMSA software for corrective action to fix the JIT/JIS missing parts. This out of stock recovery plan and supporting software (discussed below) is one of the special operations created in the AMSA software including custom interfaces. The supporting software module in the AMSA software may take the following data into consideration when determining what product to select to fulfil the manufacturing cell replenishment demand: age of product (oldest product first), proximity of product's storage location to manufacturing cell (shortest distance first) and storage location inventory level (lowest quantity first). In likely implementations, this work station interface and the associated software will be a product manufacturer (facility owner) designed hardware with custom written software for the particular facility/product(s).

The fork truck 70/AGV 60 will be the primary container handling units used in the manufacturing/warehouse operations. Fork trucks or other mobile hauling equipment will have the AMSA client via a mounted RF touch device. Fork trucks are manually driven vehicles. The fork trucks will be fitted with an RF Terminal (Tablet) to communicate task assignment and completion between the fork truck and the AMSA through the wireless network. The fork truck will have a unique ID number for tracking within the AMSA software as the operator completes tasks. The Fork Truck will also be equipped with a bar code scanner. This scanner will be used to scan bar code ID of material containers, pick points of containers and drop points of containers.

Once a container is picked up and ID scanned by the fork truck operator, the AMSA software will track that the container is on the fork truck by treating the fork truck as a mobile storage location. When the fork truck arrives at a drop location, the operator will scan the drop point ID and the scan the container ID. Once both scans are complete, the operator will confirm the drop operation has been completed to the location through the RF terminal (tablet). At this point the fork truck operator will receive a next task assigned by proximity or a list of tasks to choose based on priority and proximity. This will be communicate to the operator from the AMSA to the RF terminal (tablet) mounted on or otherwise associated with the fork truck.

The fork truck operator can also communicate to the manufacturing cell PLC 44 through the tablet that an operator replenishment container is at the manufacturing cell for receipt and manual unload to the operation. This would be done in a case where the manufacturing cell operator needs to come out to the fork truck to get a small container of parts and carry it back to the designated machine. The work cell interface would be used to confirm receipt of container through a manual held bar code ID scanner as needed. This could also be done manually through the Work Cell Interface Touch Screen. The AMSA software will use a pre-set trigger quantity as a manual confirmation of current cell inventory. When this trigger quantity is met it will require the operator to manually count and confirm the quantity matches. This is communicated from the AMSA to the manufacturing cell PLC 44 and tablet 48. If the actual quantity does match, the operator will indicate "Yes" on the tablet 48. If the quantity does not match the operator will indicate this by pressing "No" on the manufacturing cell tablet 48. After this step, the AMSA software will require the operator to enter the correct current quantity and press "Enter" on the work cell interface tablet. This information will be fed back to the AMSA by the manufacturing cell PLC 44. This operation removes out of stock conditions created by incorrect part quantities in the replenished container. Preventing further out of stock and production stoppages. This allows 100% inventory control of raw material, semi-finished goods and WIP with in the manufacturing system. This is a key feature that is added to the AMSA software. This will require customized software work station interfaces as described prior in this document.

AGV are a robotic device that navigate through the site by scanning its environment with a LASER scanner. The areas to be navigated are "mapped" prior to operation. The AGV knows where it is at through this map and the LASER scanning operation. The map is stored in the AGV management software. The AGV management software creates recipes for paths that the AGVs follows. This information is uploaded to the AGV through the wireless network. The AGV management software receives the task to complete from the AMSA through the wireless network. The AGV will be fitted with a PLC to communicate task assignment and completion between the AGV and AGV management software. The AGV will have a unique ID number for tracking within the AMSA software as the device completes tasks. The AGV will be equipped with an automatic bar code scanner. This scanner will be used to the scan bar code ID of material containers. The AGV will know where it is through the AGV management software and LASER Scanning equipment used for navigation within the facility. This technology will be used to confirm location and pick points of containers and drop points of containers. The AGV PLC and AGV management software will communicate to the AMSA through a site wide wireless network.

Once a container is picked up and ID scanned by the AGV and the data communicated to the AMSA. The AMSA software will track that the container is on the AGV by treating the AGV as a mobile storage location. When the AGV arrives at a drop location, the AGV will know its exact location and location ID and container ID. After the drop of the container to the designated location is complete, the AGV will confirm the drop operation has been completed to the location to the AMSA through the AGV controller, AGV management system and wireless network.

At this point the AGV will receive a next task recipe assigned. The AGV can also communicate to the work cell interface through the AGV controller, AGV management software and wireless network that a replenishment container is at the manufacturing cell for receipt. This would be done in a case where the manufacturing cell operator needs to come out to the AGV to get a small container of parts and carry it back to the designated machine. The Work Cell Interface would be used to confirm receipt of container through a manual held bar code ID scanner as needed. This could also be done manually through the work cell interface tablet 48. The AMSA software will use a pre-set trigger quantity as a manual confirmation of current cell inventory. When this trigger quantity is met it will require the operator to manually count and confirm the quantity matches. This is communicated from the AMSA to the manufacturing cell PLC 44 and tablet. If the actual quantity does match, the operator will indicate "Yes" on the work station interface tablet. If the quantity does not match the operator will indicate this by pressing "No" on the work cell interface tablet. After this step, the AMSA software will require the operator to enter the correct current quantity and press "Enter" on the work cell interface tablet. This information will be fed back to the AMSA by the manufacturing cell PLC 44.

This operation removes out of stock conditions created by incorrect part quantities in the replenished container, preventing further out of stock and production stoppages. This allows 100% inventory control of raw material, semi-finished goods and WIP with in the manufacturing system.

The automated storage and retrieval system (ASRS) is a vertical crane device that automatically receives, stores and delivers material containers form racking within its confined area. The containers enter the ASRS on conveyors. These conveyors can have the containers place on them by either an AGV or fork truck. The cranes pick up the containers from the conveyor and place them in racking. The cranes robotic devices controlled by a PLC based controller. The ASRS will receive put away tasks and delivery tasks from the AMSA. The outbound containers are placed on a conveyor by the crane. The conveyor transfers the container to a pick up location for pick up by AGV or fork truck. The receiving docks will receive raw materials and semi-finished goods from outside manufactures/suppliers via tucks. The tucks will back into the dock for unloading. These trucks can be unloaded by either AGV or fork truck. As the materials are unloaded they will be placed in the inbound raw material staging area. Sometimes loads will be transferred directly to the raw material storage area bypassing the staging area.

Regarding the inbound raw material staging area 82, as raw material and semi-finished goods are picked up and unloaded by AGV or fork truck from the truck at the receiving docks, the system will record the dock ID that the load is unloaded from and the bar code ID located on the raw material or semi-finished goods. This information will be recorded in the AMSA software through the wireless network. Once the load is removed from the truck on AGV or fork truck, it will place the raw material or semi-finished goods in a specific location and record the location ID. This information along with the bar code ID for the raw material or finished goods will be recorded in the AMSA software. Once raw materials are recorded to a location in the inbound raw material staging area, they will be added to the task list for either storage in the raw material storage area or direct transferred to a manufacturing cell raw material area. The direct transfer will happen in a severe out of stock situation only. An example of a raw material staging area 82 or a finished goods staging area 90 is a floor location adjacent to associated dock doors where goods unloaded from a truck/trailer are grouped together for processing by operators or where WIP/finished goods are grouped together prior to outbound truck/trailer loading. Painted outlines may correspond to trailer storage locations and may be numbered and/or bar coded accordingly.

Figure 4:
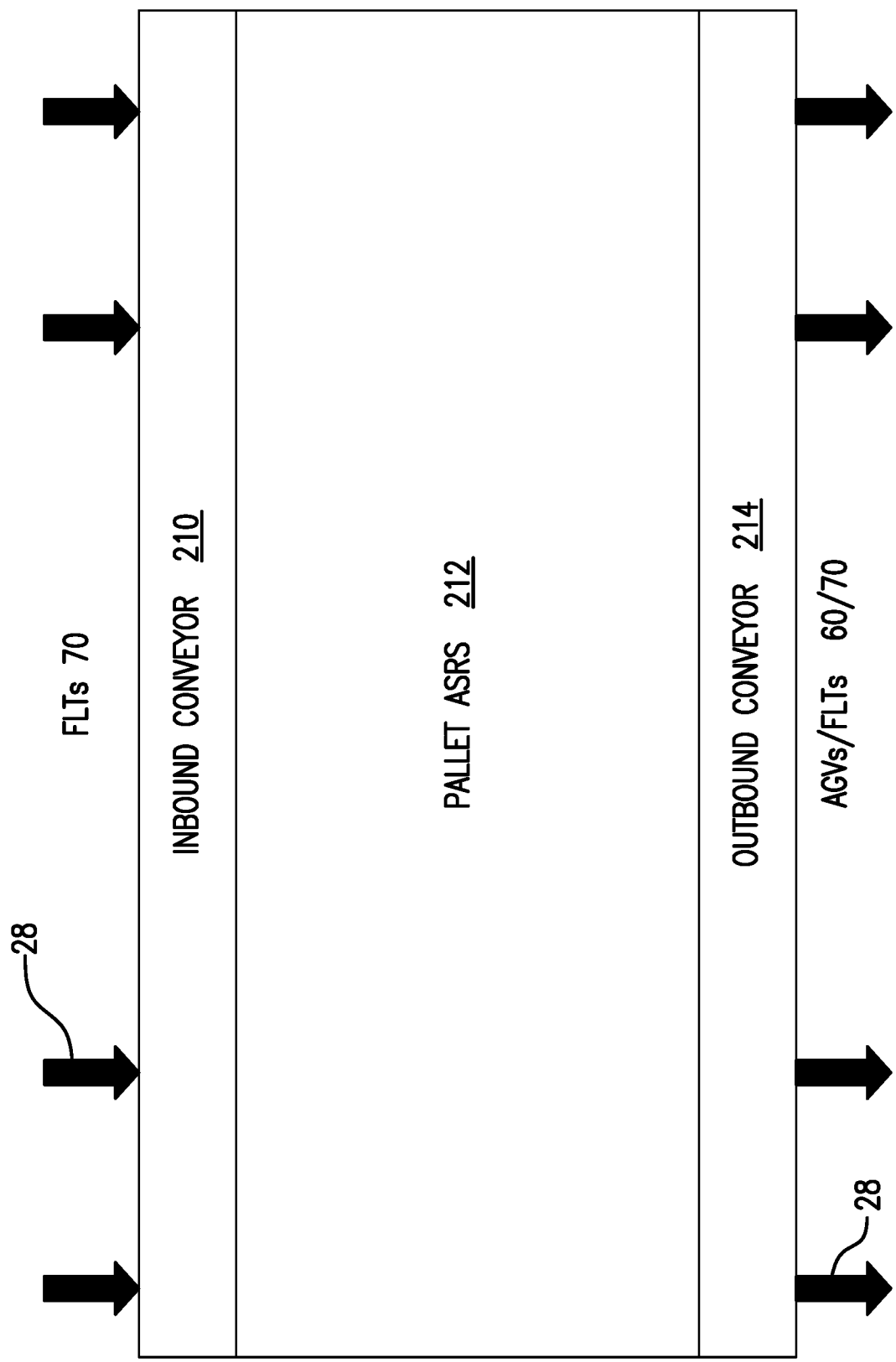
FIG. 4 is a schematic view of a raw material storage area in the manufacturing facility of FIG. 1.

The raw material storage area 84 can comprise block storage on the floor, rack storage manned by fork truck or AGV, ASRS (automated storage and retrieval system) and/or conveyors. FIG. 4 shows an inbound conveyor 210, an ASRS 212, and an outbound conveyor 214. The exemplary inbound raw materials are received palletized and such pallets are transferred via fork lift trucks 70 to the inbound conveyor. The outbound conveyor may transfer the pallets to FLTs 70 and/or AGVs 60.

Once the load is received in the raw material storage area it will be placed or transferred to a specific location. The storage location ID along with the bar code ID for the raw material or finished goods will be recorded in the AMSA software. Once raw materials are recorded to a location in the raw material storage area, they will be added to the FIFO list (first in first out). As material is needed at the manufacturing cell raw material area, the AMSA will check the FIFO list for the available container.

When the material is stored in block storage or racking, the exact static pickup location will be communicated to the AGV or fork truck by the AMSA and the AGV management software. When the material is stored in an ASRS, the AMSA will know the exact storage location and assign the task to the ASRS. The ASRS is a robotic storage device that executes the required task through a PLC. The ASRS will deliver the required container to a pickup location by means of mechanical conveyors. Upon arrival of the container to the pickup location, the ASRS PLC will tell the AMSA the container is ready for pickup. The AMSA will communicate this to the AGV or fork truck. At this pick up location the material will be picked up and delivered to the manufacturing cell raw material area by either AGV or fork truck. At pick up the bar code ID will be scanned and the AMSA software will direct the delivery location needed through the AGV management software and wireless network.

The manufacturing cell raw material area 50 will have specific locations for delivery of the raw material or semi-finished goods. As the material is delivered to these locations, the location ID will be scanned and delivered to the AMSA software for recording. This communication will be though the wireless network from AGV system or the fork truck RF terminal (tablet). The replenishment task for these locations will be triggered by the work station interface PLC 45 to the AMSA software.

The manufacturing cell WIP area 52 will have specific locations for delivery of the WIP material. As the material is delivered to these locations, the location ID will be scanned and delivered to the AMSA software for recording. This communication will be though the wireless network from AGV System or the fork truck RF terminal (tablet). The replenishment task for these locations will be triggered by the work station interface PLC 45 to the AMSA software.

Manufacturing cells can be assembled to perform manual, semi-automatic or automatic operations. These operations could be welding, machining, assembly, coating, kitting or any other of a number of manufacturing tasks. These cells could contain custom machines, robotic devices, conveyors, presses and multiple other devices required to complete the required task. The configuration within the Manufacturing Cells of the devices is unlimited.

Figure 6:
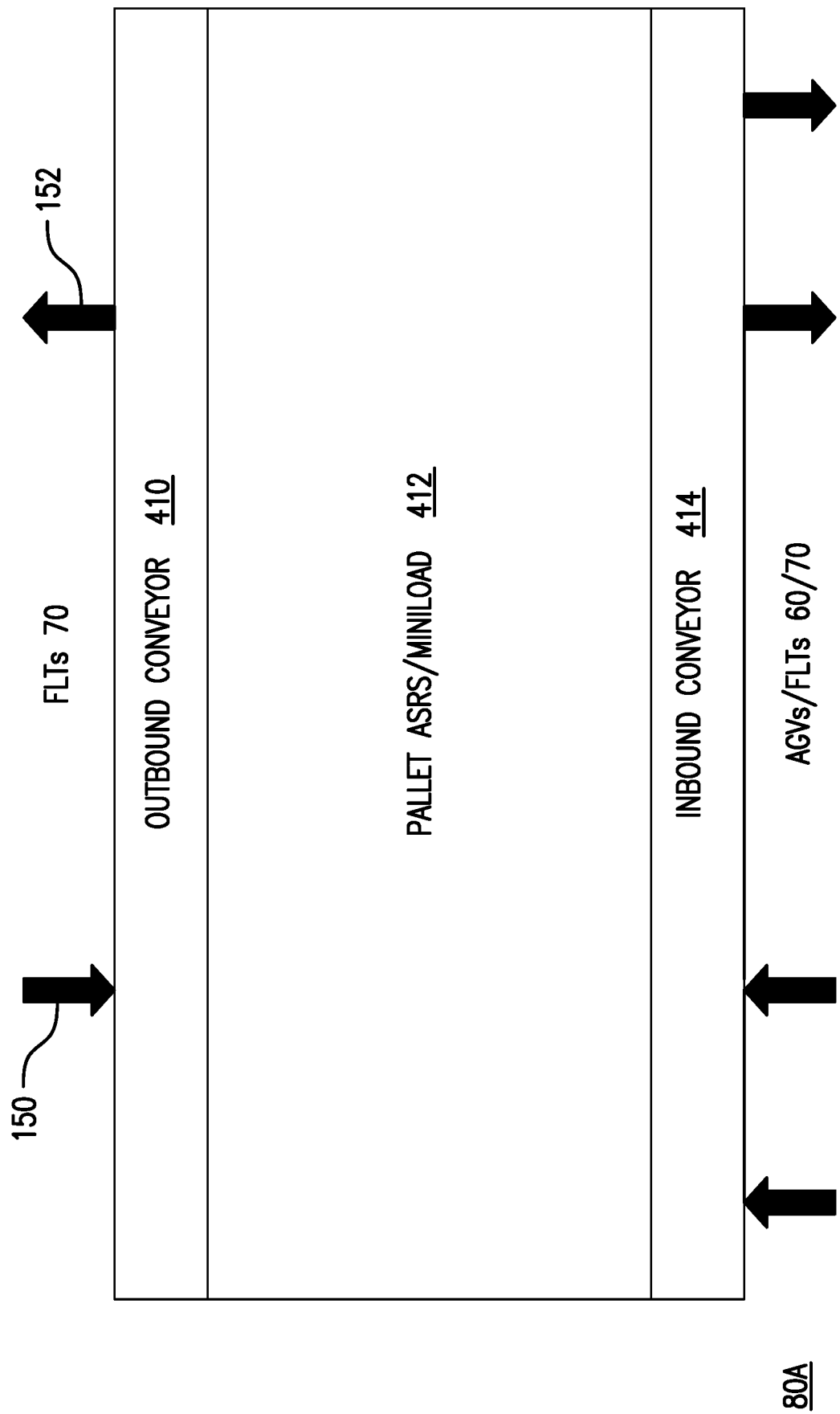
FIG. 6 is a schematic view of a main work-in-progress (WIP) storage area in the manufacturing facility of FIG. 1.

The WIP storage areas can be block storage on the floor, rack storage manned by fork truck or AGV, ASRS (Automated Storage and Retrieval System) and/or conveyors. FIG. 6 shows the main WIP storage area 80A having an outbound (leaving the ASRS to be shipped to external locations or to be used for internal manufacturing purposes) conveyor 410, an ASRS 412, and an inbound conveyor 414. The exemplary inbound raw materials are received palletized and such pallets are transferred via fork lift trucks 70 to the inbound conveyor. The outbound conveyor may transfer the pallets to FLTs 70. Alternative to pallet ASRS, the storage may be miniload, a form of ASRS where goods are placed into bins, totes or onto trays. The size of such containers can be easily picked up and handled by operators as opposed to pallets that require a fork lift truck.

Figure 7:
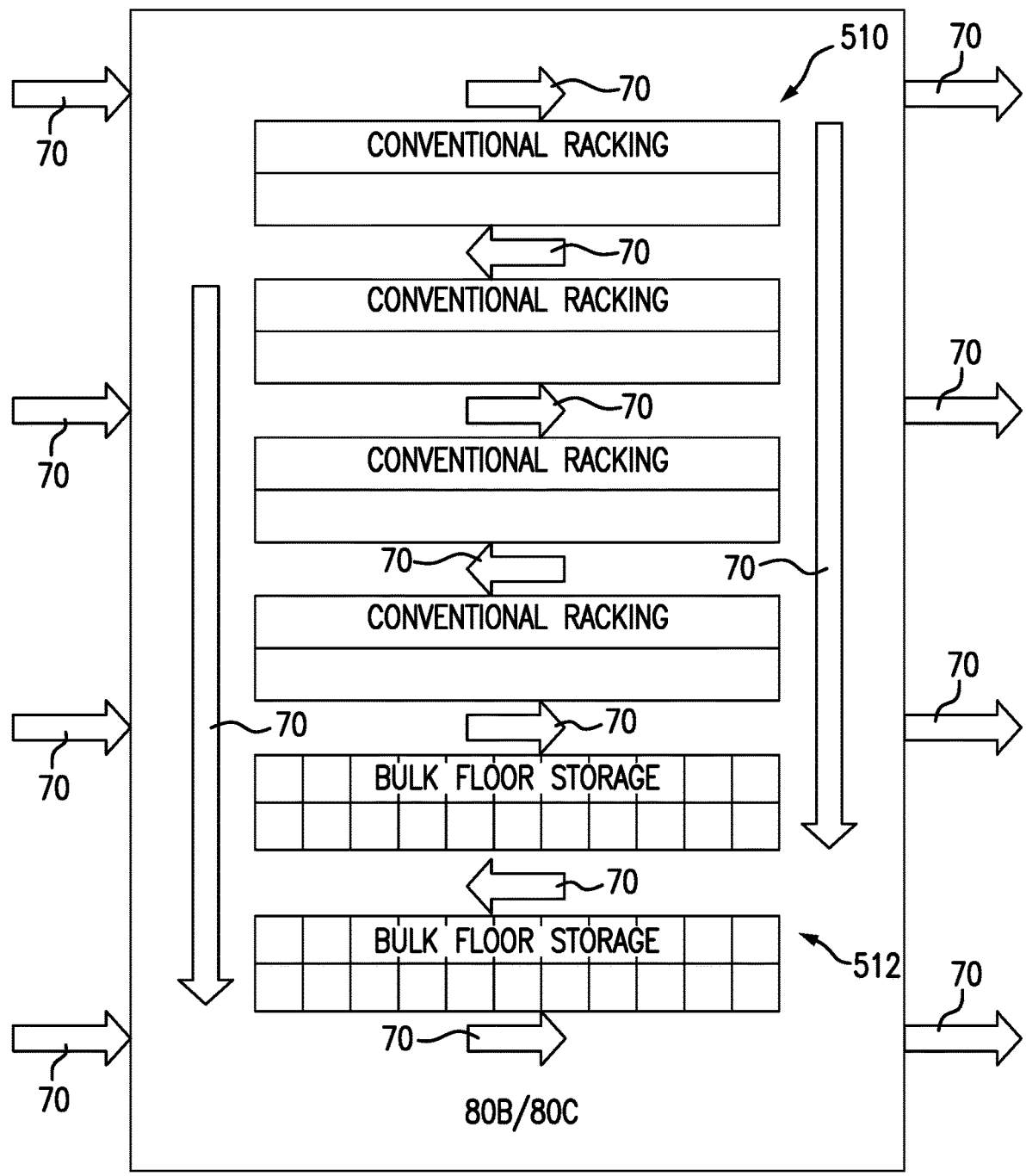
FIG. 7 is a schematic view of a secondary work-in-progress (WIP) storage area in the manufacturing facility of FIG. 1.

FIG. 7 shows one of the secondary WIP storage areas 80B, 80C. This may have one or more aisles of conventional racking 510 and/or floor bulk storage 512.

Once the load is received in the WIP storage area it will be placed or transferred to a specific location. The storage location ID along with the bar code ID for the raw material or finished goods will be recorded in the AMSA software. Once raw materials are recorded to a location in the WIP storage area, they will be added to the FIFO list (first in first out). As material is needed at the manufacturing cell raw material area 50, the AMSA will check the FIFO list for the available container. When the material is stored in block storage or racking, the exact static pickup location will be communicated to the AGV or fork truck by the AMSA and the AGV management software.

When the material is stored in an ASRS, the AMSA will know the exact storage location and assign the task to the ASRS. The ASRS is a robotic storage device that executes the required task through a PLC. The ASRS will deliver the required container to a pickup location by means of mechanical conveyors. Upon arrival of the container to the pickup location, the ASRS PLC will tell the AMSA the container is ready for pickup. The AMSA will communicate this to the AGV or fork truck. At this pick up location the material will be picked up and delivered to the manufacturing cell raw material area 50 by either AGV or fork truck. At pick up the bar code ID will be scanned and the AMSA software will direct the delivery location needed through the AGV management software and wireless network.

Figure 5:
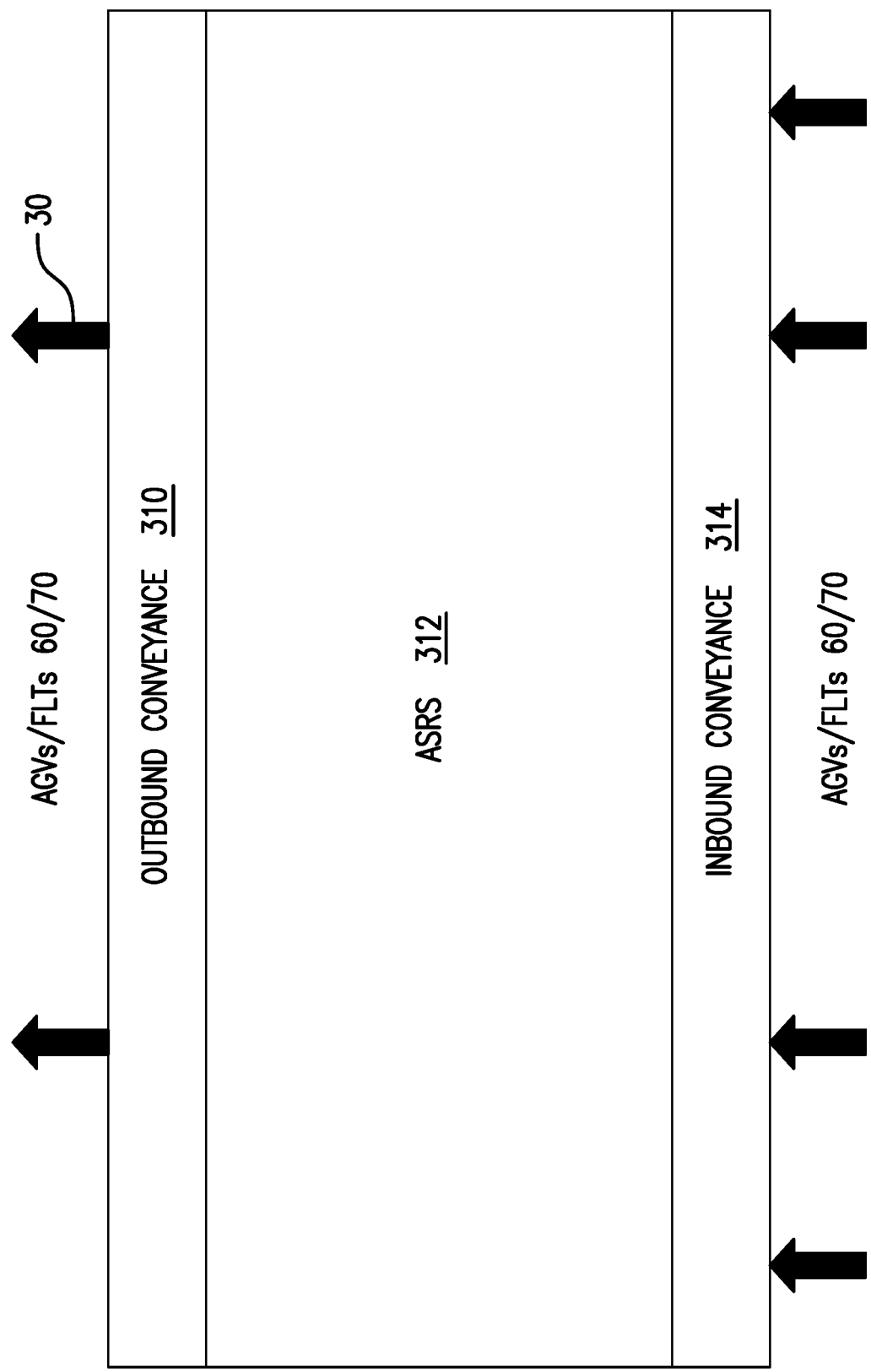
FIG. 5 is a schematic view of a finished goods storage area in the manufacturing facility of FIG. 1.

The finished goods storage area 92 can be block storage on the floor, rack storage manned by fork truck or AGV, one or more types of ASRS (automated storage and retrieval system) or one or more types of conveyance (case conveyor, pallet conveyor, shuttle car, AGV, monorail etc.) supporting the handling of any type of container the finished goods are housed in. This, whereas inbound raw materials are likely to be stored on industry-standard pallets, the nature of the finished goods may require custom containers or other devices and thus a broader range of product-specific/facility specific/equipment may be used in the finished goods storage area than in the raw materials storage area. FIG. 5 shows an outbound conveyance 310, an ASRS 312, and an inbound conveyance 314. The exemplary outbound finished goods are received palletized and such pallets are transferred via FLTs 70 and/or AGVs 60 to the inbound conveyance. The outbound conveyance may transfer the pallets to FLTs 70 and/or AGVs 60.

Once the load is received in the finished goods storage area it will be placed or transferred to a specific location. The storage location ID along with the bar code ID for the raw material or finished goods will be recorded in the AMSA software. Once raw materials are recorded to a location in the finished goods storage area, they will be added to the FIFO list (first in first out). As finished goods are needed at the outbound finished goods area, the AMSA will check the FIFO List for the available container. When the material is stored in block storage or racking, the exact static pickup location will be communicated to the AGV or fork truck by the AMSA and the AGV management software. When the material is stored in an ASRS, the AMSA will know the exact storage location and assign the task to the ASRS. The ASRS is a robotic storage device that executes the required task through a PLC. The ASRS will deliver the required container to a pickup location by means of mechanical conveyors. Upon arrival of the container to the pickup location, the ASRS PLC will tell the AMSA the container is ready for pickup. The AMSA will communicate this to the AGV or fork truck.

At this pick up location the material will be picked up and delivered to the Manufacturing Cell Raw Material Area by either AGV or Fork Truck. At pick up the bar code ID will be scanned and the AMSA software will direct the delivery location needed through the AGV management software and wireless network.

As finished goods are unloaded form the finished goods storage area, the AGV or fork truck will deliver the finished goods to a specific location in the outbound staging area. The AGV or fork truck will scan the finished goods ID then the outbound finished goods staging area location ID. This information will be communicated to the AMSA by the fork truck RF terminal or AGV management software through the wireless network. This information to be recorded in the AMSA.

The shipping docks will be used to load finished goods for delivery to the customer. The tucks will back into the loading dock for loading. The trucks can be loaded by either AGV or fork truck. As the materials are loaded the ID will be scanned and they will be recorded on the shipping manifest by the AMSA.

The tool storage and maintenance area will be used to store spare parts and model specific tools for cell conversion. In some locations, the manufacturing cells will be designed to be converted to run specific processes. These will require model specific tools for cell conversion. The tool storage and maintenance area will be fitted with one or multiple work station interface PLC 124 and tablets. These work station tablets will be used to communicate to the AMSA. The AMSA will pre-stage the next set of tools for cell conversion prior to re-tool commencing therefore eliminating waste in the form of wasted time.

The AMSA will calculate and forecast the nominal time for scheduled maintenance and cleaning based on the following: WIP flow; finished goods demand; part availability; service interval required. This will allow preplanning of scheduled maintenance based on the current health of the system rather than trended timeframes (thus preventing interruptions to the manufacturing process by unforeseen breakdowns). This is a key feature that is added to the AMSA software. This will require customized software work station interfaces as described prior in this document.

Figure 8:
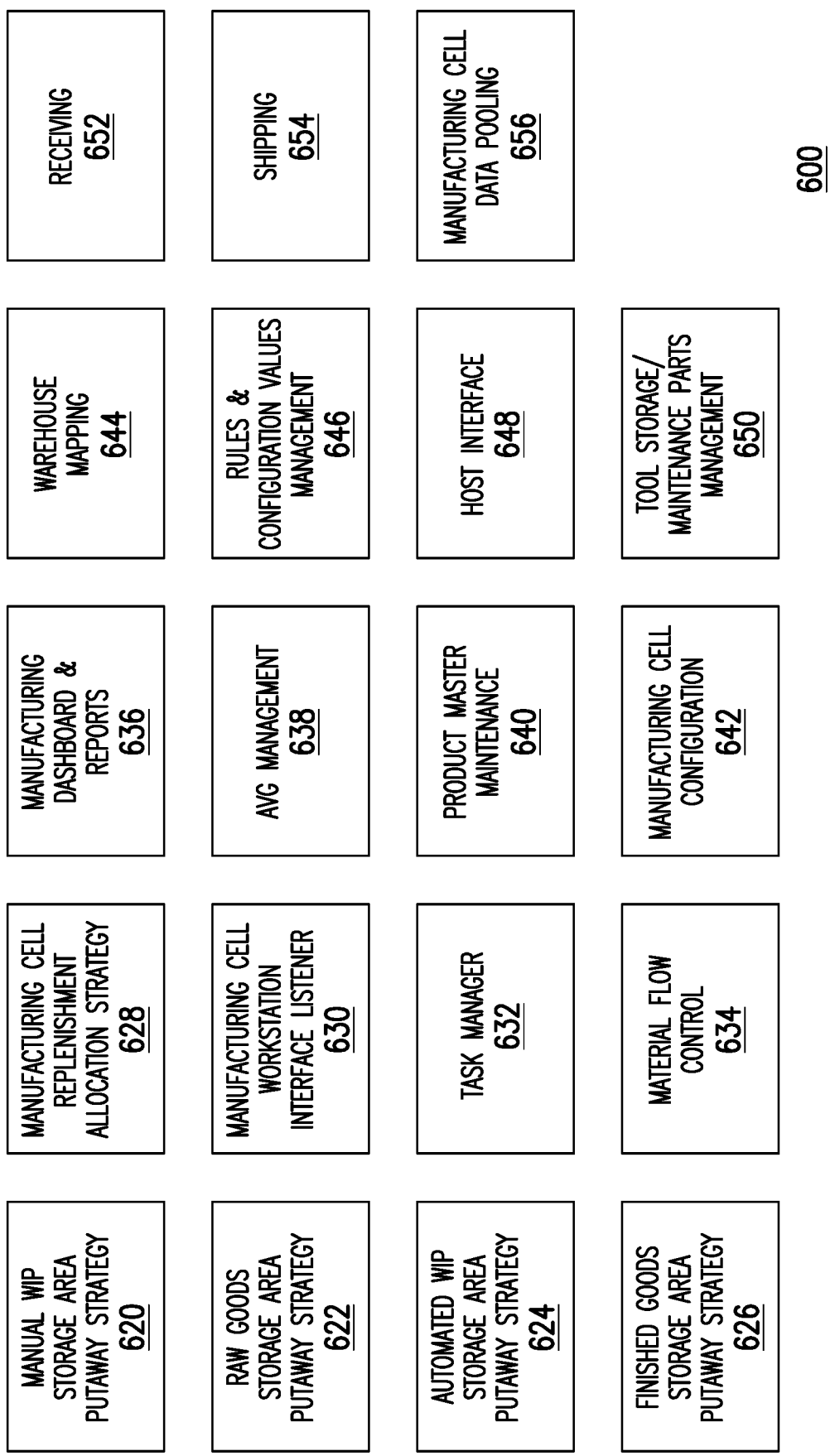
FIG. 8 is a diagram of software modules in an adaptive manufacturing software application (AMSA).

FIG. 8 shows modules within the AMSA software 600 on the server(s) 32. A first module is a manual WIP storage area strategy module 620. This module determines the optimal storage location a container of goods is to be placed into in the manual WIP storage area. 80B & 80C. This determination is based upon warehouse mapping configuration set up in the AMSA database. This data includes product master configuration stating one or more storage zones the product currently under consideration can be stored in; location data defining the current availability, ability to store additional containers and proximity to the present location of the container of product under consideration. Module 620 selects all suitable locations and sequences them by zone the product can be stored in, location with most available space and location closest to current location of container. Operators using FLT-mounted tablets 71 running a putaway screen using data from generated by the module 620 will be directed by this module when putting away WIP/finished goods picked up from a WIP/finished goods manufacturing cell output location 54.

Raw goods (materials) storage area putaway strategy module 622 determines the optimal storage location a container of goods is to be placed into in the raw goods storage area 84. This determination is based upon the warehouse mapping data as described for the manual WIP storage area strategy module 620. Operators using FLT-mounted tablets 71 running the putaway screen using data from the module 622 will be directed by this module when putting away raw goods picked up from a receiving dock staging area 82.

Automated WIP storage area putaway strategy module 624 determines the optimal storage location a container of goods is to be placed into in the automated WIP storage area(s) 80A. This determination is based upon the warehouse mapping data as described for the manual WIP storage area strategy module 620. Operators using FLT-mounted tablets 71 running the putaway screen using data from the module 624 will be directed by this module when putting away WIP/finished goods picked up from a WIP/finished goods manufacturing cell output location 54 or from a receiving dock staging area 82.

Finished goods storage area putaway strategy module 626 determines the optimal storage location a container of goods is to be placed into in the finished goods storage area 92. This determination is based upon the warehouse mapping data as described for the manual WIP storage area strategy module 620. Operators using FLT-mounted tablets 71 running the putaway screen using data from the module 626 will be directed by this module when putting away finished goods picked up from a WIP/finished goods manufacturing cell output location 54.

Manufacturing cell replenishment allocation strategy module 628 receives replenishment notifications and emergency replenishment notifications from the manufacturing cells from the manufacturing cell tablet 48 or the manufacturing cell PLC 44 to AMSA server 32 via the workstation interface PLC 45. This module then determines the optimal container of goods to be selected to replenish a manufacturing cell raw goods or WIP manufacturing cell storage location. This determination is based upon data detailing stored inventory and warehouse mapping configuration set up in the AMSA database. The exemplary inventory stored data includes product, container identification, location identification, product attributes, product availability status and product quantity. The exemplary warehouse mapping configuration data includes product master configuration stating product attributes to be considered for selection (e.g. manufacturing data, to ensure oldest product is used in assembly before younger product); location data defining the current availability, and proximity to the manufacturing cell location to be replenished. Module 628 selects the oldest available inventory currently stored in a location closest to the manufacturing cell location to be replenished. The module 628 creates task records of task type replenishment in the task database table 822 detailing product, source storage location, destination manufacturing cell location, timestamp of when the task was created and priority (emergency replenishment tasks are given a higher priority than other replenishment tasks).

A manufacturing cell workstation interface listener module 630 integrates with every manufacturing cell's workstation interface processing a number of event types. Exemplary event types are subassembly complete notification, manufacturing cell issue notification, manufacturing cell replenishment alert, emergency manufacturing cell replenishment alert, manufacturing cell out-of-stock event and manufacturing cell long term failure notification. These events are detailed below.

Figure 9:
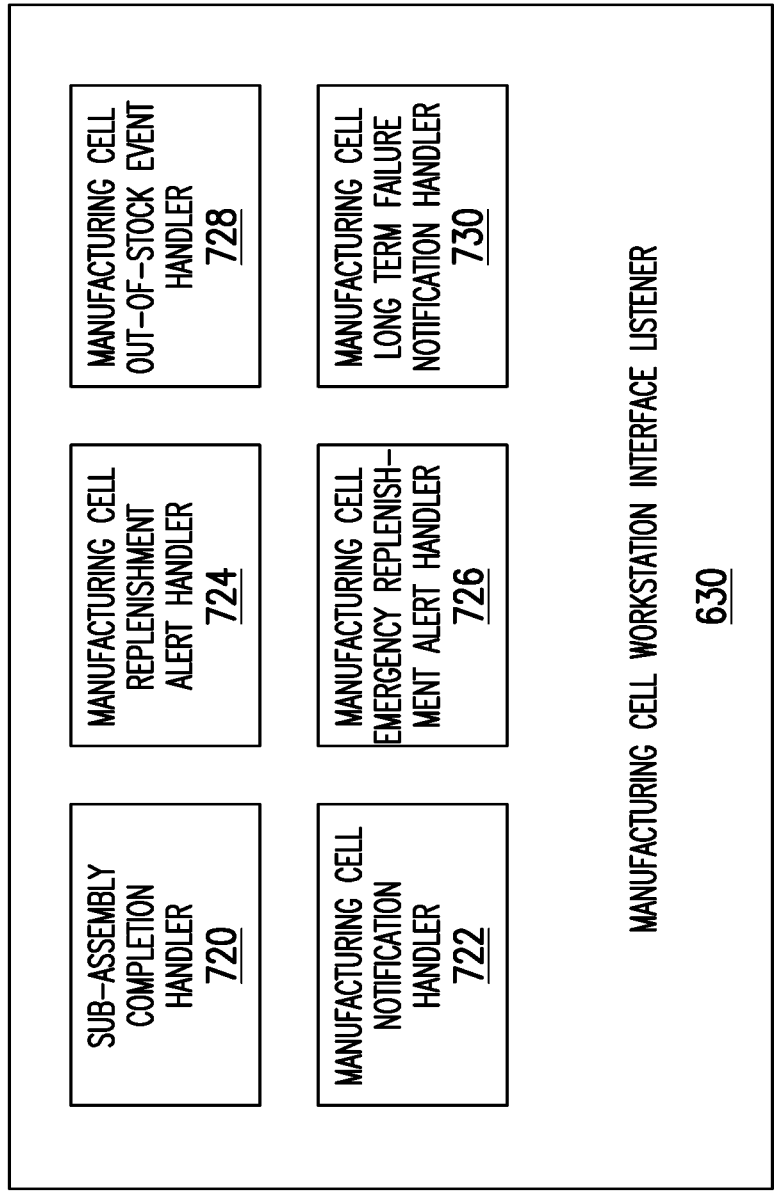
FIG. 9 is a diagram of a manufacturing cell workstation interface listener module in the AMSA.

Sub-assembly complete notification is a signal generated by the manufacturing cell PLC 44 and communicated to AMSA server 32 via workstation interface PLC 45. For sub-assembly complete notification events, the sub-module sub-assembly completion handler 720 (FIG. 9) creates an inventory record in the AMSA database for the completed sub-assembly and depletes the inventory levels logically held in the manufacturing cell raw goods or WIP storage locations as per the bill of materials for the sub-assembly in the inventory table of the AMSA database. The module records all data reported relating to the manufacture of this emerging sub-assembly with field options such as: completed successfully with no intervention/completed successfully with intervention/completed unsuccessfully thus recording achieved assembly parameters in the AMSA database and cell level error codes from the PLC to the AMSA database; unique assembly identification numbers and cycle time. In addition, a tally of the number of produced sub-assemblies is kept, once the tallied total reaches the required number of parts scheduled to be produced, the task manager module 632 will be instructed to create a maintenance task to change the tooling of the manufacturing cell to convert the manufacturing cell to produce an alternative sub-assembly, (i.e., automatic change over planning for conversion of the manufacturing cell).

Manufacturing cell issue notification is a signal generated by either a manufacturing cell tablet 48 or by the manufacturing cell PLC 44; both are communicated to AMSA server 32 via workstation interface PLC 45 informing of automatic cell health assessments of the manufacturing cell. For manufacturing cell issue notification events, the sub-module manufacturing cell notification handler 722 will handle notifications detailing that maintenance is to be alerted to rectify manufacturing cell issue by the creation of a maintenance task type in the task database table 822 detailing issue, timestamp of occurrence, and manufacturing cell this occurred in.

Manufacturing cell replenishment alert is a signal generated by either a manufacturing cell tablet 48 or by the manufacturing cell PLC 44; both are communicated to AMSA server 32 via workstation interface PLC 45 instructing one or more devices to move raw materials and/or WIP to the manufacturing cell and prompting the operator via the manufacturing cell tablet 48 for automatic real time inventory verification to the PLC. For manufacturing cell replenishment alerts, the sub-module manufacturing cell replenishment alert handler 724 will handle notifications that a raw material manufacturing cell storage location requires replenishment, triggering the manufacturing cell replenishment allocation strategy. This is done by sending a message internally in AMSA to the manufacturing cell replenishment allocation strategy 628, detailing manufacturing cell location, timestamp of occurrence and with a normal level priority.

Manufacturing cell emergency replenishment alert is a signal generated by a manufacturing cell tablet 48 communicated to AMSA server 32 via workstation interface PLC 45 instructing one or more devices to move raw materials and/or WIP to the manufacturing cell. For emergency manufacturing cell replenishment alerts, made as a result of incorrect inventory levels being reported or items at the manufacturing cells raw goods and WIP storage location found to be defective, the sub-module manufacturing cell emergency replenishment alert handler 726 will handle notifications that a manufacturing cell storage location requires replenishment, triggering the manufacturing cell replenishment allocation strategy. Resulting replenishment tasks will be given the highest priority for immediate execution. This is done by sending a message internally in AMSA to the manufacturing cell replenishment allocation strategy 628, detailing manufacturing cell location, timestamp of occurrence and with a normal level priority.

Manufacturing cell out-of-stock event is a signal generated by a manufacturing cell tablet 48 communicated to AMSA server 32 via workstation interface PLC 45. For manufacturing cell out-of-stock events, the sub-module manufacturing cell out-of-stock event handler 728 will execute a recovery plan that has been defined as part of the AMSA system implementation and stored in the recovery plan AMSA database tables 898. This will include sending notification messages to the workstation interface of the manufacturing cell, informing the operator of the corrective actions to take. This will also include sending an interface message to the host system (e.g., an enterprise resource planning (ERP) application, manufacturing execution system or warehouse management system which may on the server 32 or a separate server) informing of the issue, this could result in host system operators placing emergency orders or re-scheduling production plans.

Manufacturing cell long term failure notification is a signal generated by an operator setting the manufacturing cell into the long term failure state using the manufacturing cell tablet 48. The tablet communicates the signal to the AMSA server 32 via workstation interface PLC 45. The operator may decide to set the manufacturing cell into long-term failure, a logical state, due to, e.g., an out-of-stock event, maintenance issue or tool change issue taking much longer than anticipated and requiring emergency steps to be taken to compensate for this manufacturing cell not being able to operate.

Responsive to manufacturing cell long term failure, the sub-module manufacturing cell long term failure notification handler 730 will execute just in sequence (JIS) skipped assembly recovery steps defined as part of the AMSA system implementation and stored in the recovery plan database tables 898. This will include sending notification messages to the workstation interface of the manufacturing cell, informing the operator of the corrective actions to take and instructing a manufacturing cell to skip manufacture of an assembly in a sequence of assemblies while manufacturing remaining assemblies in the sequence. This will also include sending an interface message to the host system (e.g., an enterprise resource planning (ERP) application, manufacturing execution system or warehouse management system which may be on the server 32 or a separate server) informing of the issue, this could result in host system operators placing emergency orders or re-scheduling production plans. In addition signals to other manufacturing cells will be sent from the AMSA server to the workstation interface PLC of the required upstream manufacturing cell to stop manufacture or to start manufacturing the skipped assembly. A task will be created in the task database table 822 by sub-module 730 to trigger the task manager module 632 to move shipping containers, regardless if they are full or not, from the manufacturing cell in long term failure's output point 54 to a WIP storage area location or to an alternative manufacturing cell's output point 54 (e.g., instructing the loading of a shipping container with the remaining assemblies while leaving vacant a designated space in the container and instructing one of the devices to take the shipping container with vacant space to a WIP store).

A task manager module 632 is responsible for creating tasks of various types (putaway, replenishment, pick, transfer, maintenance) in the task database table 822 ensuring that the highest priority and oldest tasks are assigned to the material flow control module 638 and to operators. Once the tasks are reported as completed by the material flow controls module 638 or by operators using an FLT-mounted tablet 71 after they have dropped off the assigned container to the assigned destination location, the task is completed, audit trail log records are created by the task manager module 632 in the audit trail database tables 894 and the completed task is deleted by the task manger module 632 from the task database table 822. All activities managed by AMSA software are driven by tasks, there are a number of tasks types. Putaway tasks are used for putting goods into storage; transfer tasks are used for moving goods from point a to point b; replenishment tasks are used for picking preselected goods from storage to fulfil manufacturing cell replenishment demand; maintenance tasks are used to detail and manage manufacturing cells requiring issue recovery All tasks that are to be partially or completely executed using material handling equipment (e.g. AGV transfer of goods, putaway of goods into ASRS or retrieval of goods from ASRS) will be managed by material flow control module 634. The material handling equipment will be mapped out and configured in various material flow mapping database tables 828 during the setup of the AMSA system by the AMSA project development team in the material flow control module 634 defining transport paths, handover positions between different subsystems (e.g. AGV to pallet conveyor) and zones served by each type of material handling equipment. The tasks being handled by material flow control module 634 will be managed as a separate entity recorded in the transport assignment database table 834. Tasks in the task database table 822 that are to be executed using material handling equipment are selected by the material flow control module 634 highest priority and oldest task first and an associated transport assignment record is created by the material flow control module 634. The material flow control module 634 then send messages/instructions to the appropriate subsystem (e.g., pallet crane) to execute the part of the task this subsystem is responsible for (e.g., pick up of pallet from ASRS rack location and deposit on conveyor handover position).

This mapping ensures that only physically possible moves are requested (e.g., requests for pallets to move upstream of a downstream flowing conveyor are not made); congestion management can be executed (e.g., requesting five pallets of goods to be sent to a conveyor destination that can only physically fit three pallets); and equipment availability monitoring (only material handling equipment that is currently available and error free will be instructed to execute tasks by the material flow control module 634).

A manufacturing dashboards & reports module 636 will extract data from multiple AMSA database tables and present them to operators via the manufacturing cell tablet 47 using various graphical means so that the current operating level of the manufacturing plant, the inventory held within the plant and the status of current operations are clearly and quickly understood by the observer. This will ensure that any adverse situation or points of failure are quickly shown to the operator in such a way as they can be quickly seen, understood and handled. The screens and reports may show current, past and forecasted system performance and demands can be readily viewed via graphical means including pie charts, histograms, line charts and data tables.

The manufacturing dashboard & reports module 636 will also include key performance indicators showing system performance can be readily monitored such as manufacturing cell availability, forecaster manufacturing rate versus actual, inventory levels, number of active replenishment tasks etc.

An AGV management module 638 will be responsible for communicating requests for an empty AGV to be assigned to a transport assignment, pick up a container from a source location and drop off to a destination location with additional options to rotate 180 degrees and for the AGV to remain at the destination location after drop-off to the fleet management system 62. The AGV management module will examine the transport assignment table with records created by the material flow control module 642 and take over the responsibility of transport assignments that now need to be executed by the AGV subsystem. This module will ensure that the highest priority and oldest tasks are executed first and will send requests to the fleet management system 62 in a 'piece-meal' fashion in expected situations where the fleet management system 62 can only deal with a smaller number of tasks at any one time.

A product master maintenance module 640 is responsible for data entry and maintenance of product 836, unit of measure 838, product attribute 840, material status 846 and adjust reason 848 database table content. Data for these database tables will be created via product master messages from the host system or by data entry via the screens provided by this module. Screens, database entities that are made available to the operation to view and edit the details of raw materials, sub-assemblies and finished goods.

Exemplary product master data records created and maintained will include product id, product description, product image, putaway instructions, picking instructions and an optional field indicating an alternative part which is the product id of another part that can be used if this part is no longer available. Exemplary product master data records created and maintained will also include unit of measure data for piece parts, cases, pallets, drums, totes etc. the unit of measure data will include how many pieces in a container (tote, pallet, case, etc.), dimensions of unit of measure and weight of unit of measure.

A manufacturing cell configuration module 642 is responsible for data entry and maintenance of manufacturing cell 850, bill of material 852, manufacturing cell type 858, manufacturing cell status 860, manufacturing cell operation status 862 and manufacturing cell input point type 864 database table content. Thus, instructing the manufacturing cell to assemble the finished goods as defined. Data for these database tables will be created by data entry via the screens provided by this module. Screens and database entities will be made available to support the operation creating and maintaining manufacturing cells. The data to be created and maintained will included manufacturing cell name: manufacturing cell status (on, off, runout): manufacturing cell operation mode (normal, tool exchange, long term failure): manufacturing cell type; input point details (for raw goods or WIP), input point type, part numbers to replenish here, replenishment trigger minimum (level of inventory this manufacturing cell location will fall below or equal to trigger replenishment), replenishment maximum (level of inventory to pick to fulfil the manufacturing cell location replenishment demand); output points (WIP/finished goods); IO communication points to manufacturing cell plc; bill of materials, sub-assemblies this manufacturing cell is able to produce, constituent part details (part numbers and quantities of raw material and WIP required to create the sub-assembly), tooling required, manufacturing cell target assembly parameters; upstream manufacturing cells that provide sub-assemblies to this manufacturing cell and downstream manufacturing cells this manufacturing cell provides sub-assemblies to (e.g., communicating predetermined assembly sequencing to the PLC).

A storage area (warehouse) mapping module 644 is responsible for data entry and maintenance of storage zone 870, storage cluster 872, location profile 874, container type 876, location 826, equipment type 882 and equipment 884 database table content. Data for these database tables will be created via by data entry via the screens provided by this module. Screens and database entities will supplied as part of the storage area (warehouse) mapping module 644 to support the operation creating and maintaining storage areas. Exemplary data to be created and maintained will include locations detailing type of container location can house, number of containers the location can house, putaway path (weighting indicating distance from input point to location, the shorter the distance, the lower the weighting), pick path (weighting indicating the distance from the location to the manufacturing cells, the shorter the distance, the lower the weighting); storage zones, a group of locations with a common configuration; storage clusters, a group of zones with a priority as to the first one to be selected for putaway within the cluster.

A rules and configuration values management module 646 is responsible for data entry and maintenance of configuration values and AMSA business rules database table 886 content. Data for these database tables will be created data entry via the screens provided by this module. Screens and database entities will be made available to allow the operation to create and maintain site specific configurations and rules the standard and/or customer AMSA software will use to operate the plant.

Examples of rules and configuration values are setting for janitor jobs for audit trail maintenance, keeping audit trail date for a maximum of x days and rules regarding user authentication to log into AMSA software.

A host interface module 648 will be responsible for communicating with the host system (enterprise resource planning application, manufacturing execution system or warehouse management system) and maintenance of host interface message log database table 888 content. Data for these database tables will be created via interface from the host system. Screens, database entities and processing logic will be made available to the operation so that AMSA can integrate to this site's host system (e.g. warehouse management system, manufacturing execution system, enterprise resource planning, financial control application). Various messages will be exchanged between AMSA and the host system. Such messages can be, but are not limited to, product master, inbound delivery notification, production orders, bill of material, outbound delivery notification, inventory status etc. Database tables and supporting screens will allow the operation to view the status of messages uploaded and downloaded between the host system and AMSA, allowing the operation to view the contents of messages, see the processing status of a message (successful or failed), modify message content and re-attempt to upload a failed message from AMSA to the host system.

A tool storage/maintenance parts management module 650 is responsible for controlling when manufacturing cells should have tooling replaced, reacting to newly created maintenance tasks created by the task manager module 632 when a manufacturing cell is ready to be switched to create an alternative sub-assembly; react to operator demand for tool replacement and repair and log details of such events; provide scheduled maintenance logs and trigger maintenance tasks when scheduled maintenance is due. The module is responsible for data entry and data maintenance of AMSA database 800 (FIG. 10) fields for manufacturing cell tooling 820, tooling detail 832, maintenance activity types 844 and maintenance schedule 856 database table content. Exemplary data for these database tables will be created by data entry via the screens provided by this module. Screens, database entities and processing logic will be made available to the operations so that manufacturing cell maintenance activities can be controlled and driven by AMSA software. Exemplary data created, maintained and used for driving this process will include number of cycle between tool change out, manufacturing cell maintenance event logging, manufacturing cell availability statistics, maintenance schedule, tooling types, tooling required in each manufacturing cell and tooling repair audit trail.

A receiving module 652 will be responsible for the receipt and-or check-in of goods advised to AMSA via the host system and goods not advised to AMSA. The receiving module 652 is responsible data entry and maintenance of expected receipt 880, advanced shipment notification 824 and receipt 830 database table content. Data for these database tables will be created via interface from the host system, by data entry via the screens provided by this module or, for receipts, created by background process within this module. Screens, database entities and process logic will be made available to the operators using FLT-mounted tablets 71 so that receipt of raw goods, pre-assembled sub-assemblies or WIP from other manufacturing areas on the same campus can be received into the building, created as inventory records in inventory database tables 842 for subsequent putaway into a storage area.

The receiving module 652 enables operators using FLT-mounted tablets 71 to carry out expected receipt handling, advanced shipping notification handling, the creation of receipts when processing expected receipts and advanced shipping notifications and blind receipt. Expected receipt handling covers receipt of quantities of parts procured via purchase order, status monitoring and reconciliation of received goods against that advised. Advanced shipment notification handling covers receipt of containerized goods procured via purchase order, status monitoring, reconciliation of received goods against that advised. Blind receipt covers miscellaneous creation of inventory into the building with no pre-announcement.

Expected receipts and advanced shipping notifications will be created via host interface download or by data entry using screens provided by this module. Operators using FLT-mounted tablets 71 will receive product unloaded from trailers at the receiving dock 24 that have been staged at the receiving dock staging area 82. Received goods are created as inventory within AMSA. Once inventory is created the received goods can be putaway into storage by operating using FLT-mounted tablets 71 as directed by the raw goods storage area putaway strategy module 622 and/or the automated WIP storage area putaway strategy module 624.

A shipping module 654 will be responsible for order creation, allocation, picking, consolidation, staging, trailer loading and shipping of return-to-vendor stock, WIP and finished goods from the production plant. The receiving module 652 is responsible data entry and maintenance of order type 854, order 866, order line 878, order group 890 and shipment 892 database tables. Data for these database tables will be created via interface from the host system, by data entry via the screens provided by this module or, for receipts, created by background process within this module. Screens, database entities and process logic will be made available to the operation so that the shipment of WIP and/or finished goods to customers or other plants within the campus can be executed. The shipping module will be responsible for order creation, allocation, picking, consolidation, staging, trailer loading and shipment.

Shipments, order groups, orders and order lines will be created by the host system. They may be directly sent as messages host interface download or may be manually entered (e.g., on an administrative screen on an administrative computer or other device communicating with the server) using screens provided by this module. Created orders will have appropriate product selected to fulfil the order using the module's allocation process, selecting the optimal goods for each order line detailed in the order. Allocated product is released for picking, creating pick tasks in the task database table 822. Operators using FLT-mounted tablets 71 will be directed by the shipping module 654 to pick product from WIP storage 80A and/or finished goods storage 92 and consolidate and stage completed picks to a location within the shipping dock staging area 90. Operators using FLT-mounted tablets 71 will load trailers parked at the shipping dock 26. Loaded trailer will then be shipped by operators using FLT-mounted tablets 71.

A manufacturing cell data pooling module 656 will be responsible for archiving historic AMSA audit trail from the live AMSA database 800 (FIG. 10) into a separate database instance on the AMSA server 32. Database tables that this module will manage record creation and maintenance of include inventory transaction log, manufacturing cell notification log, production schedule log, order log, expected receipt log, advanced shipping notification log and audit trail. Operators using FLT-mounted tablets will have access to screens of the manufacturing cell data pooling module 656 and be able to view, filter and sort the data as required by the operator. AMSA process logic will archive data created recording manufacturing cell statistics, inventory transactions etc. to another database on the AMSA server for subsequent analysis. Such data will include manufacturing cell audit trail records older than x days are removed from the AMSA system and persisted in another pre-defined database.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A manufacturing system (20) comprising:
    one or more stores (84; 80A-80C; 92) for raw materials, work-in-progress (WIP), and finished goods;
    a plurality of manufacturing cells (40A-40F), each cell including:
        one or more machines (42A-42C) for manufacturing an assembly; and
        a programmable logic controller (PLC) (44) for controlling the machines;
    one or more devices (60, 70) for moving raw material, WIP, and finished goods; and one or more servers (32) for:
  communicating with the PLCs and the devices, wherein the one or more servers further have programming for:
    instructing (642) the plurality of manufacturing cells to assemble finished goods from the raw materials;
    instructing (628, 632) the one or more devices to move said raw materials and finished goods; and
    just in sequence (JIS) skipped assembly recovery steps (730) for the manufacturing cells and devices,
wherein the just in sequence (JIS) skipped assembly recovery steps comprise:
  instructing (728, 730) a manufacturing cell to skip manufacture of an assembly in a sequence of assemblies while manufacturing remaining assemblies in the sequence;
  instructing (728, 730) the loading of a shipping container with the remaining assemblies while leaving vacant a designated space in the container; and
  instructing (728, 730) one of the devices to take the shipping container with vacant space to a WIP store.

2. The manufacturing system of claim 1 wherein the just in sequence (JIS) skipped assembly recovery steps comprise:
  instructing (642) a manufacturing cell, optionally the same cell that made the remaining assemblies, to make the skipped assembly; and
  loading (728, 730) the skipped assembly into the vacant space.

3. The manufacturing system of claim 2 further comprising:
  a tool maintenance and spare parts area (100) containing tools, spare parts for tools, equipment for repairing and maintaining the tools, and means (124) for communicating with the one or more servers.

4. The manufacturing system of claim 1 further comprising:
  a tool maintenance and spare parts area (100) containing tools, spare parts for tools, equipment for repairing and maintaining the tools, and means (124) for communicating with the one or more servers.

5. A method for operating a manufacturing system (20), the manufacturing system comprising:
  one or more stores (84; 80A-80C; 92) for raw materials, work-in-progress (WIP), and finished goods;
  a plurality of manufacturing cells (40A-40F), each cell including:
    one or more machines (42A-42C) for manufacturing an assembly;
    a programmable logic controller (PLC) for controlling the machines;
  one or more devices (60, 70) for moving raw material, WIP, and finished goods; and
  one or more servers (32) for:
    communicating with the PLCs and the one or more devices,
wherein the method comprises:
  using (642) the plurality of manufacturing cells to assemble finished goods from the raw materials;
  using (628, 632) one or more devices to move said raw materials and finished goods (632);
  communication and tracking (728 or 730) by the one or more servers of just in sequence (JIS) skipped assembly recovery steps for the manufacturing cells;
  instructing (728, 730) a manufacturing cell to skip manufacture of an assembly in a sequence of assemblies while manufacturing remaining assemblies in the sequence;
  instructing (728, 730) the loading of a shipping container with the remaining assemblies while leaving vacant a designated space in the container; and
  instructing (728, 730) one of the devices to take the shipping container with vacant space to a WIP store.

6. The method of claim 5 wherein the communication and tracking of just in sequence (JIS) skipped assembly recovery steps further comprises:
  instructing (642) a manufacturing cell, optionally the same cell that made the remaining assemblies, to make the skipped assembly; and
  loading (728, 730) the skipped assembly into the vacant space.

7. The method of claim 6 further comprising:
  automatic cell inventory tracking (720, 632) from the PLC to a data base; and
  automatic real time inventory verification (724, 726) to the PLC.

8. The method of claim 6 further comprising:
  automatic cell health assessments (722) of the manufacturing cells;
  automatic maintenance scheduling (650) for the manufacturing cells.

9. The method of claim 6 further comprising:
  automatic change over planning for conversion (650) of the manufacturing cells.

10. The method of claim 6 wherein:
  the one or more devices comprise driver-operated fork trucks with operator interface tablets communicating with the one or more servers.

11. The method of claim 6 further comprising one or more of:
  the one or more servers communicating (642) predetermined assembly sequencing to the PLC;
  the one or more servers communicating (642) target assembly parameters to the PLC;
  the one or more servers communicating (720) unique assembly identification numbers to the PLC;
  the one or more servers recording (720) achieved assembly parameters in a data base; and
  the one or more servers recording (722) cell level error codes from the PLC to a data base.

12. The method of claim 5 further comprising:
  automatic cell inventory tracking (720, 632) from the PLC to a data base; and
  automatic real time inventory verification (724, 726) to the PLC.

13. The method of claim 12 further comprising:
  automatic cell health assessments (722) of the manufacturing cells;
  automatic maintenance scheduling (650) for the manufacturing cells.

14. The method of claim 12 further comprising:
  automatic change over planning for conversion (650) of the manufacturing cells.

15. The method of claim 12 wherein:
  the one or more devices comprise driver-operated fork trucks with operator interface tablets communicating with the one or more servers.

16. The method of claim 5 further comprising:
  automatic cell health assessments (722) of the manufacturing cells;

automatic maintenance scheduling (650) for the manufacturing cells.

17. The method of claim 5 further comprising:
automatic change over planning for conversion (650) of the manufacturing cells.

18. The method of claim 5 wherein:
the one or more devices comprise driver-operated fork trucks with operator interface tablets communicating with the one or more servers.

19. The method of claim 5 further comprising one or more of:
the one or more servers communicating (642) predetermined assembly sequencing to the PLC;
the one or more servers communicating (642) target assembly parameters to the PLC;
the one or more servers communicating (720) unique assembly identification numbers to the PLC;
the one or more servers recording (720) achieved assembly parameters in a data base; and
the one or more servers recording (722) cell level error codes from the PLC to a data base.

* * * * *